United States Patent
Inoki et al.

(10) Patent No.: US 10,681,735 B2
(45) Date of Patent: Jun. 9, 2020

(54) WIRELESS ENVIRONMENT EVALUATION METHOD AND WIRELESS COMMUNICATON SYSTEM

(71) Applicant: NIPPON TELEGRAPH AND TELEPHONE CORPORATION, Tokyo (JP)

(72) Inventors: Akiyoshi Inoki, Yokosuka (JP); Hirantha Abeysekera, Yokosuka (JP); Munehiro Matsui, Yokosuka (JP); Takeo Ichikawa, Yokosuka (JP); Masato Mizoguchi, Yokosuka (JP); Akira Kishida, Tokyo (JP); Daisuke Koizumi, Tokyo (JP); Akira Yamada, Tokyo (JP); Yoshifumi Morihiro, Tokyo (JP); Takahiro Asai, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/078,700

(22) PCT Filed: Feb. 23, 2017

(86) PCT No.: PCT/JP2017/006950
§ 371 (c)(1),
(2) Date: Aug. 22, 2018

(87) PCT Pub. No.: WO2017/146179
PCT Pub. Date: Aug. 31, 2017

(65) Prior Publication Data
US 2019/0059107 A1 Feb. 21, 2019

(30) Foreign Application Priority Data
Feb. 26, 2016 (JP) ................... 2016-035593

(51) Int. Cl.
*H04W 74/08* (2009.01)
*H04W 24/06* (2009.01)
(Continued)

(52) U.S. Cl.
CPC ....... *H04W 74/0816* (2013.01); *H04W 16/22* (2013.01); *H04W 24/06* (2013.01);
(Continued)

(58) Field of Classification Search
CPC ......... H04W 74/0816; H04W 28/0284; H04W 16/22; H04W 24/08; H04W 24/06; H04W 74/08; H04W 84/12
See application file for complete search history.

(56) References Cited

U.S. PATENT DOCUMENTS

2007/0207738 A1   9/2007 Nakayama et al.
2014/0348087 A1*  11/2014 Wu ................. H04W 72/04
                                                  370/329
(Continued)

FOREIGN PATENT DOCUMENTS

EP    1670183 A1   6/2006
EP    2736285 A1   5/2014
(Continued)

OTHER PUBLICATIONS

Daisuke Kawasaki et al., "A QoS Management Scheme for VoWLAN in Radio Interference", IEICE Technical Repoert, Jul. 12, 2006 (Jul. 12, 2006), vol. 106, No. 167, with partial translation.
(Continued)

Primary Examiner — Dady Chery
(74) Attorney, Agent, or Firm — Harness, Dickey & Pierce, P.L.C.

(57) ABSTRACT

Provided is a wireless environment evaluation method including a step 1 acquiring a transmission and reception history of wireless signals transmitted and received between (Continued)

the plurality of wireless stations and acquiring or estimating a number of wireless stations in transmission standby, based on the transmission and reception history; a step 2 calculating a normal reception rate S in a congesting situation in reception according to the number of wireless stations in transmission standby; a step 3 acquiring a normal reception rate S' of the wireless signals per a fixed channel use time from the transmission and reception history in the prescribed wireless station; and a step 4 determining a degree of the exposed situation in reception according to a ratio of the normal reception rate S' to the normal reception rate S.

10 Claims, 14 Drawing Sheets

(51) Int. Cl.
*H04W 24/08* (2009.01)
*H04W 16/22* (2009.01)
*H04W 28/02* (2009.01)
*H04W 84/12* (2009.01)

(52) U.S. Cl.
CPC ....... *H04W 24/08* (2013.01); *H04W 28/0284* (2013.01); *H04W 74/08* (2013.01); *H04W 84/12* (2013.01)

(56) References Cited

U.S. PATENT DOCUMENTS

| | | | |
|---|---|---|---|
| 2015/0182867 A1* | 7/2015 | Kelly | A63H 1/24 446/242 |
| 2016/0174165 A1 | 6/2016 | Ikenaga et al. | |
| 2016/0227578 A1* | 8/2016 | Lee | H04W 74/004 |
| 2017/0026819 A1* | 1/2017 | Xue | H04W 8/005 |

FOREIGN PATENT DOCUMENTS

| | | |
|---|---|---|
| JP | 2007-235533 A | 9/2007 |
| JP | 2011-155321 A | 8/2011 |
| JP | 2015-115667 A | 6/2015 |
| WO | WO-2011/124744 A1 | 10/2011 |
| WO | WO-2015015891 A1 | 2/2015 |

OTHER PUBLICATIONS

Akiyoshi Inoki et al., "Hidden/exposed terminal estimation method using Beacon for Wireless LANs", IEICE Technical Report, Feb. 29, 2016 (Feb. 29, 2016), vol. 115, No. 496, with partial translation.
International Search Report for PCT/JP2017/006950, ISA/JP, Tokyo, dated Mar. 21 2017, with English translation attached.
Written Opinion of the ISA for PCT/JP2017/006950, ISA/JP, dated Mar. 21, 2017.
Japanese Office Action regarding related application JP 2016-035593, JPO, dated Apr. 4, 2017, with its English translation.
International Preliminary Report on Patentability, IB, Geneva, dated Aug. 28, 2018, with its English translation, incorporating the English translation of the Written Opinion of the ISA, dated Mar. 21, 2017, for PCT/JP2017/006950.
Ozgur Ekici: "Improvements and Performance Analysis of IEEE 802.11 Medium Access Protocols", Ottawa-Carleton Institute for Electrical and Computer Engineering, School of Information Technology and Engineering, Jan. 1, 2009.
Khurana S et al.: "Effect of hidden terminals on the performance of IEEE 802.11 MAC protocol", Local Computer Networks, 1998. LCN '98. Proceedings., 23rd Annual Conference on Lowell, MA, USA, Oct. 11-14, 1998, Los Alamitos, CA, USA, IEEE Comput. Soc, US, Oct. 11, 1998.
Extended European Search Report (EESR), from counterpart application EP 17756617.1. dated Jan. 9, 2020.

\* cited by examiner

FIG. 4

(1) Station B and C aren't a relation of hidden wireless stations
  (Station A isn't in an exposed situation in reception)

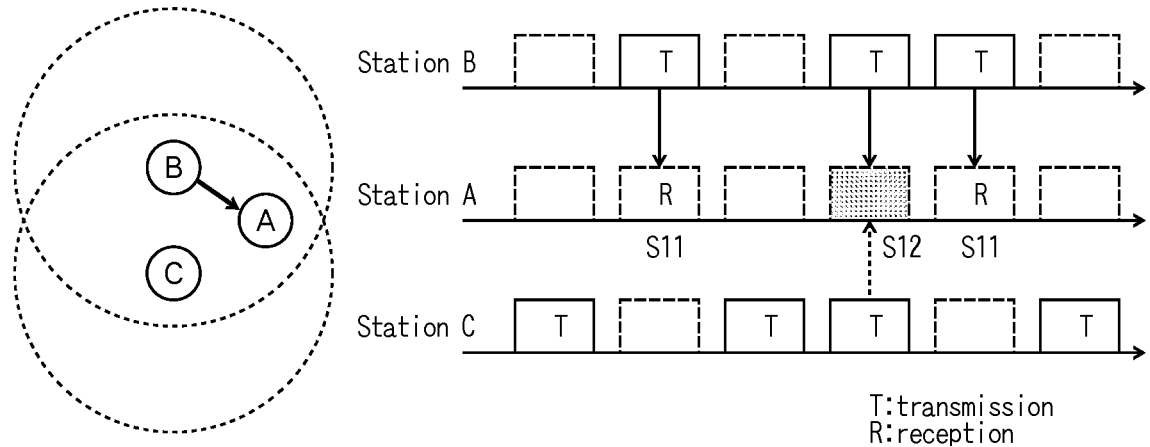

A normal reception rate of station A decreases ⇒ A congesting situation in reception (2) Station B and C are a relation of hidden wireless stations
  (Station A is in an exposed situation in reception)

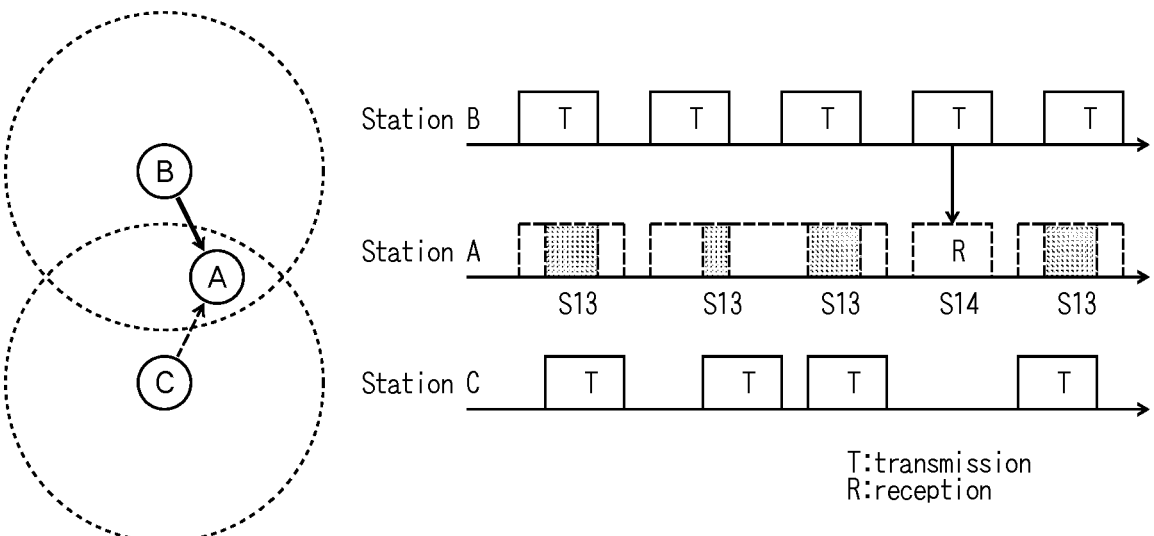

A normal reception rate of station A decreases ⇒ A exposed situation in reception

FIG. 5

(1) Station B and C aren't a relation of hidden wireless stations
    (Station A isn't in an exposed situation in transmission)

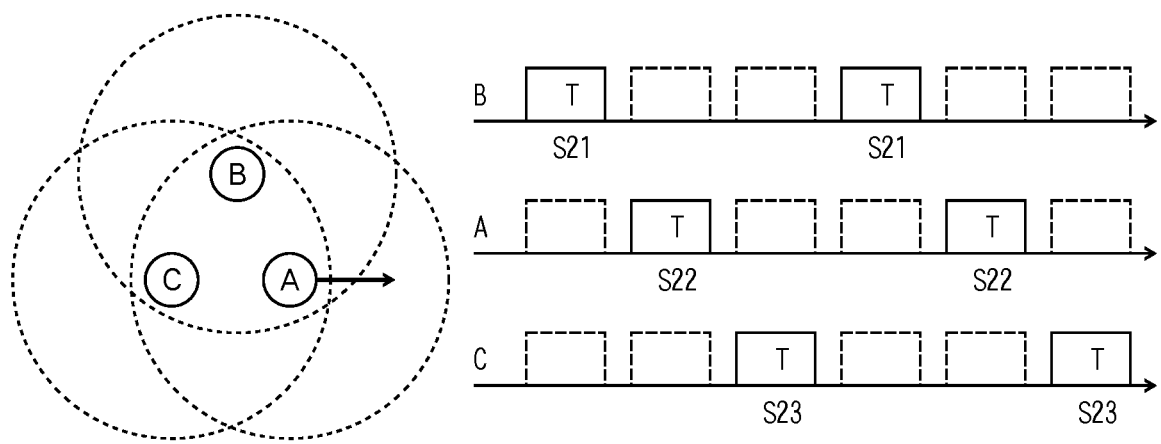

A transmission opportunity acquisition rate of station A decreases

⇨ A congesting situation in transmission (2) Station B and C are a relation of hidden wireless stations
    (Station A is in an exposed situation in transmission)

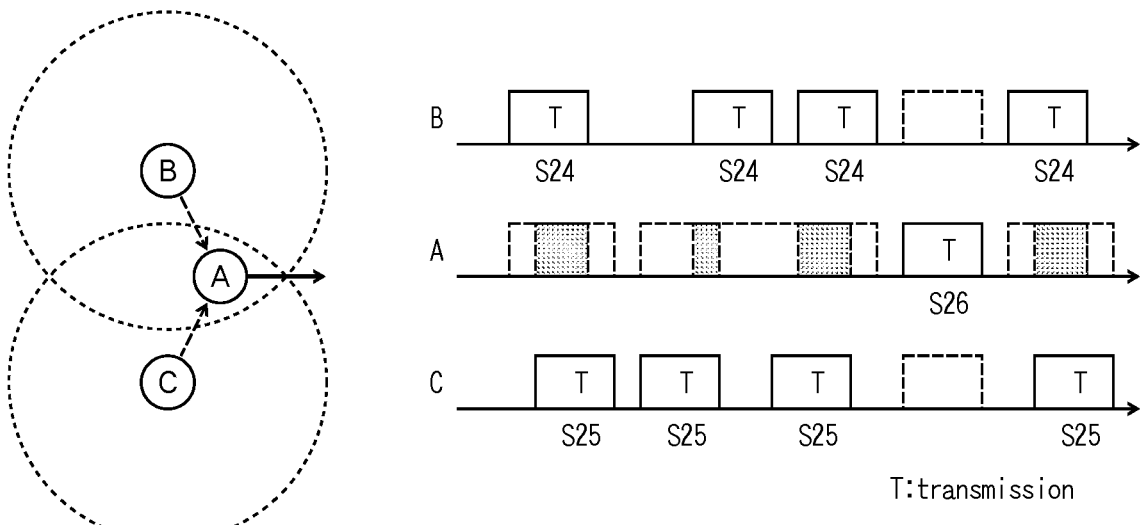

A transmission opportunity acquisition rate of station A decreases

⇨ A exposed situation in transmission (1) A: exposed situation in transmission   (2) A: exposed situation in reception (1) A: exposed situation in transmission   (2) A: exposed situation in reception

| time | access category | retransmission | channel use time | normal reception |
|---|---|---|---|---|
| T1 | AC_VO | 0 | e | OK |
| T2 | AC_BE | 1 | f | NG |
| ... | | | | |

(2) condition of statistics
  · access category : AC_VO
  · retransmission frequency : 0

| channel use time | normal reception |
|---|---|
| $x < g$ | C |
| $g \leq x < h$ | D |
| ... | |

F I G. 1 3
(1)
| time | access category | retransmission | transmission delay |
|---|---|---|---|
| T1 | AC_VO | 0 | a |
| T2 | AC_BE | 1 | b |
| ... | | | |
(2) condition of statistics
  ・access category : AC_VO
  ・retransmission frequency : 0
| transmission delay | signal ratio |
|---|---|
| $x < c$ | $\alpha$ |
| $c \leqq x < d$ | $\beta$ |
| ... | |
(3) condition of statistics
  ・access category : AC_VO
  ・retransmission frequency : 0
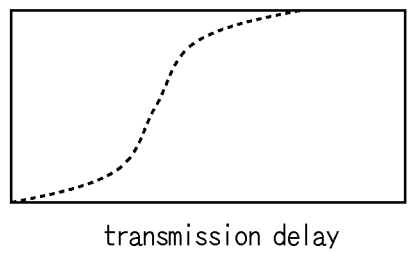
histogram
transmission delay

FIG. 14

(1) information of transmission station

| signal ID | access category | retransmission | channel use time | time 1 | time 2 | reception |
|---|---|---|---|---|---|---|
| A | AC_VO | 0 | e | TT1 | T1 | OK |
| B | AC_BE | 1 | f | TT2 | T2 | OK |
| ... | | | | | | |

(2) information of reception station

| signal ID |
|---|
| A |
| C |
| ... | time 1: transmission preparation completion time time 2: transmission start time

FIG. 15

(1) information of transmission station

| signal ID | time 1 | reception |
|---|---|---|
| A | TT1 | OK |
| B | TT2 | OK |
| ... | | | time 1: transmission preparation completion time time 2: transmission start time (2) information of reception station

| signal ID | access category | retransmission | channel use time | time 2 |
|---|---|---|---|---|
| A | AC_VO | 0 | e | T1 |
| C | AC_BE | 1 | f | T2 |
| ... | | | | |

WIRELESS ENVIRONMENT EVALUATION METHOD AND WIRELESS COMMUNICATON SYSTEM

CROSS REFERENCE TO RELATED APPLICATION

This application is a U.S. National Stage application claiming the benefit of prior filed International Application Number PCT/JP2017/006950, filed on Feb. 23, 2017 in which the International Application claims priority from Japanese Patent Application Number 2016-035593, filed on Feb. 26, 2016, the entire contents of which are incorporated herein by reference.

TECHNICAL FIELD

The present invention relates to a wireless environment evaluation method and a wireless communication system in which a plurality of wireless stations share a same wireless channel and perform wireless communication using Carrier Sense Multiple Access/Collision Avoidance (CSMA/CA) method and in which an exposed situation in reception in which a normal reception rate of a prescribed wireless station decreases due to hidden wireless stations or an exposed situation in transmission in which a transmission opportunity acquisition rate decreases due to the hidden wireless stations is determined.

BACKGROUND ART

A wireless local area network (LAN) system in compliance with the IEEE 802.11 standard has been improved in throughout every year, and have come into widespread use as one principle wireless access. Because the wireless LAN system can use an unlicensed band that is a frequency band which does not require a license, various types of wireless terminals/stations have come into widespread use. Because random access control that uses a CSMA/CA method is performed on wireless communication in the unlicensed band, a hidden wireless station problem remains a major obstacle.

The hidden wireless station problem is a problem that occurs when transmission signals of wireless stations which do not mutually perform a carrier sensing function collide with each other, thereby making a throughput characteristic worse. As a method of solving the problem, for example, a flow control that uses Request-To-Send (RTS)/Clear-To-Send (CTS) has been proposed. When it comes to exchange of an RTS frame and a CTS frame, even in a case where a wireless signal from a transmission station, which cannot be detected, is present in the reception station, the reception station configures a NAV using the CTS frame in response to the RTS frame from the transmission station, and thus the hidden wireless station problem can be solved, thereby preventing the throughput characteristic from being made worse.

Incidentally, in some cases, in the reception station that can detect a wireless signal that is transmitted by each of the hidden wireless stations, an exposed situation in reception occurs in which a normal reception rate of a desired wireless signal decreases due to exposure from the wireless signal. Incidentally, in some cases, in the transmission station that can detect the wireless signal that is transmitted by each of the hidden wireless stations, an exposed situation in transmission occurs in which a transmission opportunity acqui- sition rate for transmitting the wireless signal from the wireless station itself decreases due to exposure from the wireless signal.

However, also in some cases, a primary cause of the decrease in the normal reception rate of the reception station is that transmission timings of a plurality of transmission stations overlap while random access control that uses the CSMA/CA method is performed. Furthermore, also in some cases, a primary cause of the decrease in the transmission opportunity acquisition rate of the transmission station is that there are many wireless stations that perform the random access control that uses the CSMA/CA method. The details will be described below.

Therefore, there is a need to accurately determine the exposed situation in reception in which the normal reception rate decreases and the exposed situation in transmission in which the transmission opportunity acquisition rate decreases, to reflect a result of the determination in the access control by the transmission station and the reception station, and to improve the throughput characteristic.

Patent Document 1 discloses a method in which comparison is made between a BSS ID that is detected in an access point and a BSS ID that is detected in a station, in which the risk of packet collision is determined, and in which the decrease in throughput due to the hidden wireless station problem or an exposed wireless station problem is evaluated from the stored tendency of traffic in the access point.

Patent Document 1: Japanese Unexamined Patent Application Publication No. 2015-115667

DISCLOSURE

Problems to be Solved

In a method that is disclosed in PTL 1, the risk of occurrence of the hidden wireless station problem or the exposed wireless station problem can be determined, but specifically, whether or not the hidden wireless station problem or the exposed wireless station problem occurs, or the extent of the occurrence cannot be determined. For example, the likelihood of the packet collision is determined with the comparison between the detected BSS IDs, and additionally, from the tendency of the traffic in the access point, it is determined whether or not the decrease in throughput due to the hidden wireless station problem or the exposed wireless station problem takes place. However, these determinations are made to know only the associated risk. Therefore, for example, there is a likelihood that a result of the determination of the risk will vary depending on a wireless communication system that is not assumed.

A proposition of the present invention is to provide a wireless environment evaluation method and a wireless communication system in which the degree of an exposed situation in reception in which a normal reception rate of a prescribed wireless station decreases due to hidden wireless stations or the degree of an exposed situation in transmission in which a transmission opportunity acquisition rate decreases due to the hidden wireless stations is accurately determined in order to improve a throughput characteristic in access control by a wireless station, which uses CSMA/CA method.

Means for Solving the Problems

According to a first invention, there is provided a wireless environment evaluation method evaluating a wireless environment of a wireless communication system, which is in an exposed situation in reception in which a normal reception rate of a prescribed wireless station decreases due to hidden wireless stations, in which a plurality of wireless stations share a same wireless channel and perform wireless communication using CSMA/CA method, the wireless environment evaluation method including a step 1 acquiring a transmission and reception history of wireless signals transmitted and received between the plurality of wireless stations and of acquiring or estimating a number of wireless stations in transmission standby, based on the transmission and reception history; a step 2 calculating a normal reception rate S in a congesting situation in reception according to the number of wireless stations in transmission standby; a step 3 acquiring a normal reception rate S' of the wireless signals per a fixed channel use time from the transmission and reception history in the prescribed wireless station; and a step 4 determining a degree of the exposed situation in reception according to a ratio of the normal reception rate S' to the normal reception rate S.

According to a second invention, there is provided a wireless environment evaluation method evaluating a wireless environment of a wireless communication system, which is in an exposed situation in reception in which a normal reception rate of a prescribed wireless station decreases due to hidden wireless stations, in which a plurality of wireless stations share a same wireless channel and perform wireless communication using CSMA/CA method, the wireless environment evaluation method including a step 1 acquiring a normal reception rate S measured in another wireless station in which a congesting situation in reception according to the number of wireless stations in transmission standby is estimated to be the same as in the prescribed wireless station, based on the transmission and reception history of wireless signals transmitted and received between the plurality of wireless stations; a step 3 acquiring a normal reception rate S' of the wireless signals per a fixed channel use time from the transmission and reception history in the prescribed wireless station; and a step 4 determining a degree of the exposed situation in reception according to a ratio of the normal reception rate S' to the normal reception rate S.

According to a third invention, there is provided a wireless environment evaluation method evaluating a wireless environment of a wireless communication system, which is in an exposed situation in reception in which a normal reception rate of a prescribed wireless station decreases due to hidden wireless stations, in which a plurality of wireless stations share a same wireless channel and perform wireless communication using CSMA/CA method, the wireless environment evaluation method including a step 1 acquiring a transmission and reception history of a specific wireless signal periodically transmitted and received between the plurality of wireless stations, and acquiring a normal reception rate of the specific signal from the transmission and reception history; and a step 2 evaluating the degree of the exposed situation in reception according to the normal reception rate of the specific signal.

In the wireless environment evaluation method according to the third invention, the precision of determination of the exposed situation in reception in accordance with the normal reception rate of the specific signal may be set according to a priority, a transmission interval, and a channel use time of the specific signal.

According to a fourth invention, there is provided a wireless environment evaluation method evaluating a wireless environment of a wireless communication system, which is in an exposed situation in transmission in which a transmission opportunity acquisition rate of a prescribed wireless station decreases due to hidden wireless stations, in which a plurality of wireless stations share a same wireless channel and perform wireless communication using CSMA/CA method, the wireless environment evaluation method including a step 1 acquiring a transmission and reception history of wireless signals transmitted and received between the plurality of wireless stations, and acquiring or estimating a number of wireless stations in transmission standby, based on the transmission and reception history; a step 2 calculating a transmission opportunity acquisition rate F in a congesting situation in transmission according to the number of wireless stations in transmission standby; a step 3 acquiring a transmission delay of the wireless signals from the transmission and reception history in the prescribed wireless station, and calculating a transmission opportunity acquisition rate F' from the transmission delay; and a step 4 determining the degree of the exposed situation in transmission according to a ratio of the transmission opportunity acquisition rate F' to the transmission opportunity acquisition rate F.

According to a fifth invention, there is provided a wireless environment evaluation method evaluating a wireless environment of a wireless communication system, which is in an exposed situation in transmission in which a transmission opportunity acquisition rate of a prescribed wireless station decreases due to hidden wireless stations, in which a plurality of wireless stations share a same wireless channel and perform wireless communication using CSMA/CA method, the wireless environment evaluation method including a step 1 acquiring a transmission opportunity acquisition rate F measured in another wireless station in which a congesting situation in transmission according to a number of wireless stations in transmission standby is estimated to be the same as in the prescribed wireless station, based on a transmission and reception history of wireless signals transmitted and received between the plurality of wireless stations; a step 3 acquiring a transmission delay of the wireless signals from the transmission and reception history in the prescribed wireless station and calculating a transmission opportunity acquisition rate F' from the transmission delay; and a step 4 determining the degree of the exposed situation in transmission according to a ratio of the transmission opportunity acquisition rate F' to the transmission opportunity acquisition rate F.

According to a sixth invention, there is provided a wireless environment evaluation method evaluating a wireless environment of a wireless communication system, which is in an exposed situation in transmission in which a transmission opportunity acquisition rate of a prescribed wireless station decreases due to hidden wireless stations, in which a plurality of wireless stations share a same wireless channel and perform wireless communication using CSMA/CA method, the wireless environment evaluation method including a step 1 acquiring a transmission and reception history of a specific wireless signal periodically transmitted and received between the plurality of wireless stations, and acquiring a transmission delay of a specific signal from the transmission and reception history; and a step 2 determining the degree of the exposed situation in transmission according to the transmission delay of the specific signal.

In the wireless environment evaluation method according to the sixth invention, the precision of evaluation of the exposed situation in transmission according to the transmission delay of the specific signal may be set according to a priority, a transmission interval, and a channel use time of the specific signal.

According to a seventh invention, there is provided a wireless communication system in which a plurality of wireless stations share a same wireless channel and perform wireless communication using CSMA/CA method, the wireless communication system evaluating an exposed situation in reception in which a normal reception rate of a prescribed wireless station decreases due to a wireless station that has a or an exposed situation in transmission in which a transmission opportunity acquisition rate of the prescribed wireless station decreases due to hidden wireless stations, the wireless communication system including a unit acquiring a transmission and reception history of wireless signals transmitted and received between the plurality of wireless stations; a unit acquiring or estimating the number of wireless stations in transmission standby, based on the transmission and reception history of the wireless signals, and calculating a normal reception rate S in a congesting situation in reception according to the number of wireless stations in transmission standby and a transmission opportunity acquisition rate F in a congesting situation in transmission; a unit measuring a normal reception rate S' of the wireless signals per a fixed channel use time from the transmission and reception history in the prescribed wireless station; a unit acquiring a transmission delay of the wireless signals from the transmission and reception history in the prescribed wireless station and calculating a transmission opportunity acquisition rate F' from the transmission delay; and a unit determining the degree of the exposed situation in reception according to a ratio of the normal reception rate S' to the normal reception rate S, and determining the degree of the exposed situation in transmission according to a ratio of the transmission opportunity acquisition rate F' to the transmission opportunity acquisition rate F.

According to an eighth invention, there is provided a wireless communication system in which a plurality of wireless stations perform wireless communication using a CSMA/CA method, and in which an exposed situation in reception in which a normal reception rate of a prescribed wireless station decreases due to hidden wireless stations or an exposed situation in transmission in which a transmission opportunity acquisition rate of the prescribed wireless station decreases due to hidden wireless stations t is determined, the wireless communication system including a unit that acquires a transmission and reception history of a wireless signal that is transmitted and received between each of the plurality of wireless stations; a unit that acquires a normal reception rate S in another wireless station in which a congesting situation in reception according to the number of wireless stations in transmission standby is estimated in the same manner as in the prescribed wireless station, based on the transmission and reception history of the wireless signal, and that acquires a transmission opportunity acquisition rate F in another wireless station in which the congesting situation in transmission according to the number of wireless stations in transmission standby is estimated in the same manner as in the prescribed wireless station; a unit that measures a normal reception rate S' for every channel use time with a fixed range, of the wireless signal from the transmission and reception history in the prescribed wireless station; and a unit that acquires a transmission delay of the wireless signal from the transmission and reception history in the prescribed wireless station, and calculates a transmission opportunity acquisition rate F' from the transmission delay; and a unit that determines a degree of the exposed situation in reception according to a ratio of the normal reception rate S' to the normal reception rate S, and determines the degree of the exposed situation in transmission according to a ratio of the transmission opportunity acquisition rate F' to the transmission opportunity acquisition rate F.

According to the present invention, through the use of information that is a transmission and reception history of a wireless station that makes up a wireless communication system, the degree of an exposed situation in reception by a reception station can be accurately determined considering a congesting situation in reception, and the degree of an exposed situation in transmission in a transmission station can be accurately determined considering a congesting situation in transmission. Accordingly, according to the exposed situation in reception and the exposed situation in transmission, which occur actually in a wireless communication system, access control that is based on a CSMA/CA method in a transmission station and a reception station is possibly performed accurately. Thus, a throughput characteristic can be improved.

BRIEF DESCRIPTION OF THE DRAWINGS

FIG. 4 is a diagram for describing a relationship between hidden wireless stations and an exposed situation in reception.

FIG. 5 is a diagram for describing a relationship between hidden wireless stations and an exposed situation in transmission.

FIG. 12 is a diagram for describing a statistical processing method of calculating the normal reception rate for a channel use time.

FIG. 13 is a diagram for describing a statistical processing method of acquiring the transmission delay.

FIG. 14 is a diagram for describing a method of acquiring information relating to the transmission delay.

FIG. 15 is a diagram for describing the method of acquiring the information relating to the transmission delay.

BEST MODE FOR CARRYING OUT THE INVENTION (Example of a Configuration of a Wireless Communication System)

A wireless communication system according to the present invention has a configuration in which a master wireless station and at least one slave wireless station that are connected to each other over a wireless network perform access control with a CSMA/CA method. If a wireless LAN system in compliance with the IEEE 802.11 standard is assumed, the master wireless station corresponds to an access point (AP), and the slave wireless station corresponds to a station (STA). As an example, the AP and the STA in the wireless LAN system will be described below.

Figure 1:
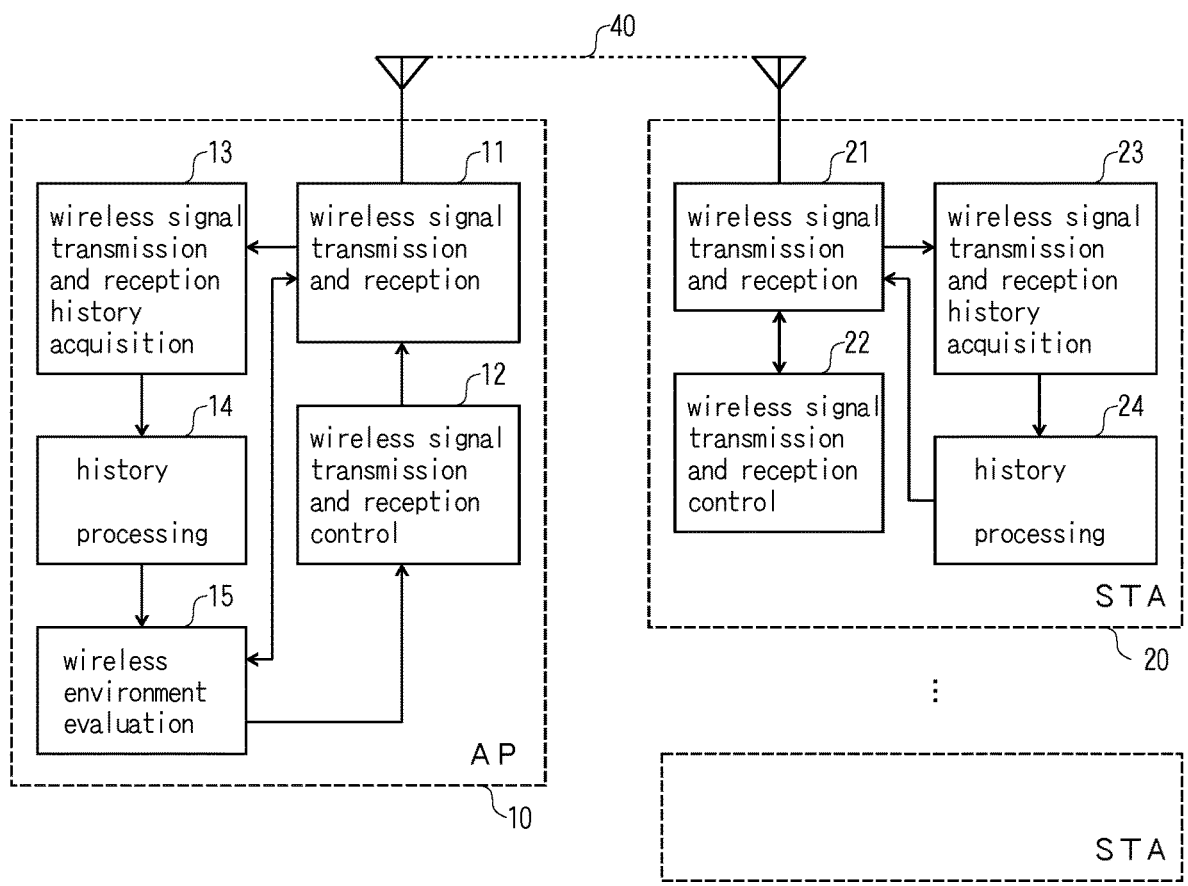
FIG. 1 is a diagram illustrating a first example of a configuration of a wireless communication system according to the present invention.

FIG. 1 is a first example of a configuration of the wireless communication system according to the present invention.

In FIG. 1, an AP 10 and an STA 20 are connected to each other over a wireless network 40 that is based on the CSMA/CA method. The AP 10 and the STA 20 include wireless signal transmission and reception sections 11 and 21, respectively, that transmit and receive wireless signal that are transferred over the wireless network 40, wireless signal transmission and reception control sections 12 and 22, respectively, each of which performs control of the wireless signal transmission and reception section, wireless signal transmission and reception history acquisition sections 13 and 23, respectively, each of which records a transmission and reception history of the wireless signal that is transmitted and received in the wireless signal transmission and reception section, and history processing sections 14 and 24, respectively, each of which processes the transmission and reception history into wireless environment information suitable for wireless environment evaluation. The AP 10 further includes a wireless environment evaluation section 15.

The STA 20 receives the wireless signal that is transmitted from the AP 10 using the wireless signal transmission and reception section 21, and inputs the received wireless signal into the wireless signal transmission and reception history acquisition section 23. The wireless signal transmission and reception history acquisition section 23 inputs the transmission and reception history of the wireless signal into the history processing section 24. The history processing section 24 acquires or estimates wireless environment information based on the transmission and reception history of the wireless signal that is transmitted and received in the STA 20, and transmits the wireless environment information from the wireless signal transmission and reception section 21 to the AP 10.

The AP 10 receives the wireless signal and the wireless environment information, which are transmitted from the STA 20, using the wireless signal transmission and reception section 11, inputs the wireless signal into the wireless signal transmission and reception history acquisition section 13, and inputs the wireless environment information into the wireless environment evaluation section 15. The wireless signal transmission and reception history acquisition section 13 inputs the transmission and reception history of the wireless signal into the history processing section 14. The history processing section 14 acquires or estimates the wireless environment information based on the transmission and reception history of the wireless signal that is transmitted and received in the AP 10, and inputs the wireless environment information into the wireless environment evaluation section 15. The wireless environment evaluation section 15 determines the wireless environment information in the AP 10, or the wireless environment information in the STA 20, and studies control necessary for each piece of wireless environment information. Control information that is determined by the wireless environment evaluation section 15 to be necessary is used for the wireless signal transmission and reception control section 12 of the AP 10 to control the wireless signal transmission and reception section 11, and is transmitted from the wireless signal transmission and reception section 11 to the STA 20. The STA 20 receives the control information that is transmitted from the AP 10, using the wireless signal transmission and reception section 21, and the wireless signal transmission and reception control section 22 uses the received control information to control the wireless signal transmission and reception section 21.

It is noted that the wireless environment evaluation section 15 of the AP 10 may be mounted in the STA 20, or may be mounted in both of the AP 10 and the STA 20. Exchanging of required environment information and required control information between the AP 10 and the STA 20 takes place depending on whether the wireless environment evaluation section 15 is installed in the AP 10 or the STA 20.

Figure 2:
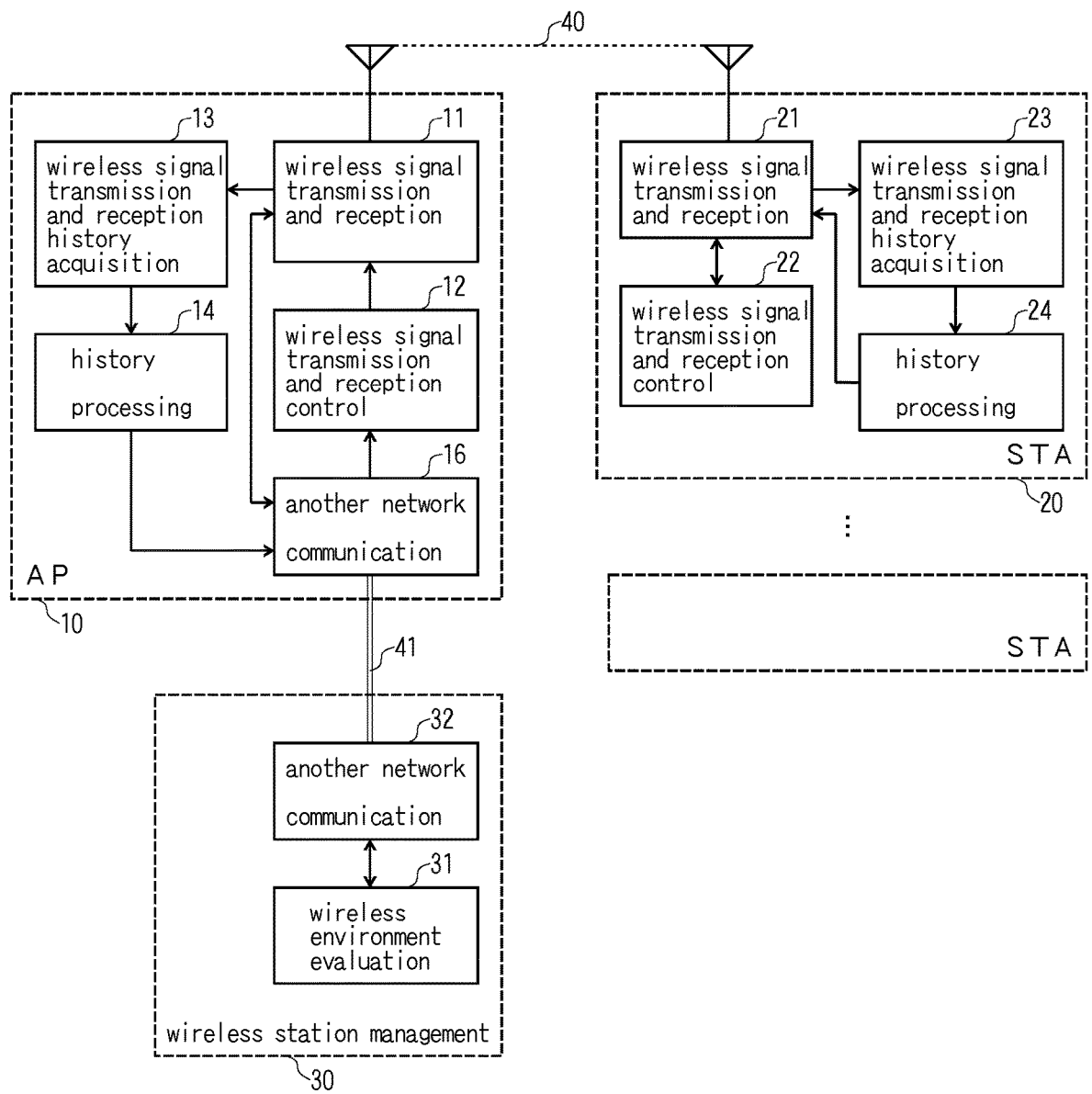
FIG. 2 is a diagram illustrating a second example of the configuration of the wireless communication system according to the present invention.

FIG. 2 is a second example of the configuration of the wireless communication system according to the present invention.

In FIG. 2, in the second example of the configuration, a wireless station managing device 30 is included, and the wireless station managing device 30 includes a wireless environment evaluation section 31 that is equivalent to the wireless environment evaluation section 15 of the AS 10 in the first example of the configuration. Another network communication section 16 of the AP 10 and another network communication section 32 of the wireless station managing device 30 are connected to each other over another network 41. In the AP 10, the wireless signal transmission and reception section 11, the wireless signal transmission and reception control section 12, and the history processing section 14 is connected to the network communication section 16. In the wireless station managing device 30, the wireless environment evaluation section 31 is connected to another network communication section 32. At this point, the network 41 may be a wired network, and may be a wireless network, for example, a mobile network, which is based on a method that is different from the CSMA/CA method.

The wireless environment information that is obtained in the history processing section 14 of the AP 10 is sent from the network communication section 16 to the network communication section 32 of the wireless station managing device 30 over the network 41, and is further input into the wireless environment evaluation section 31. The wireless environment information that is obtained in the history processing section 24 of the STA 20 is transferred to the AP 10, is further sent from the network communication section 16 to the network communication section 32 of the wireless station managing device 30 over the network 41, and is further input into the wireless environment evaluation section 31. The control information that is obtained as a result of the determination by the wireless environment evaluation section 31 is sent to the wireless signal transmission and reception control section 12 and the wireless signal transmission and reception section 11 of the AP 10 over the network 41, and is further sent from the AP 10 to the wireless signal transmission and reception control section 22 of the STA 20.

Figure 3:
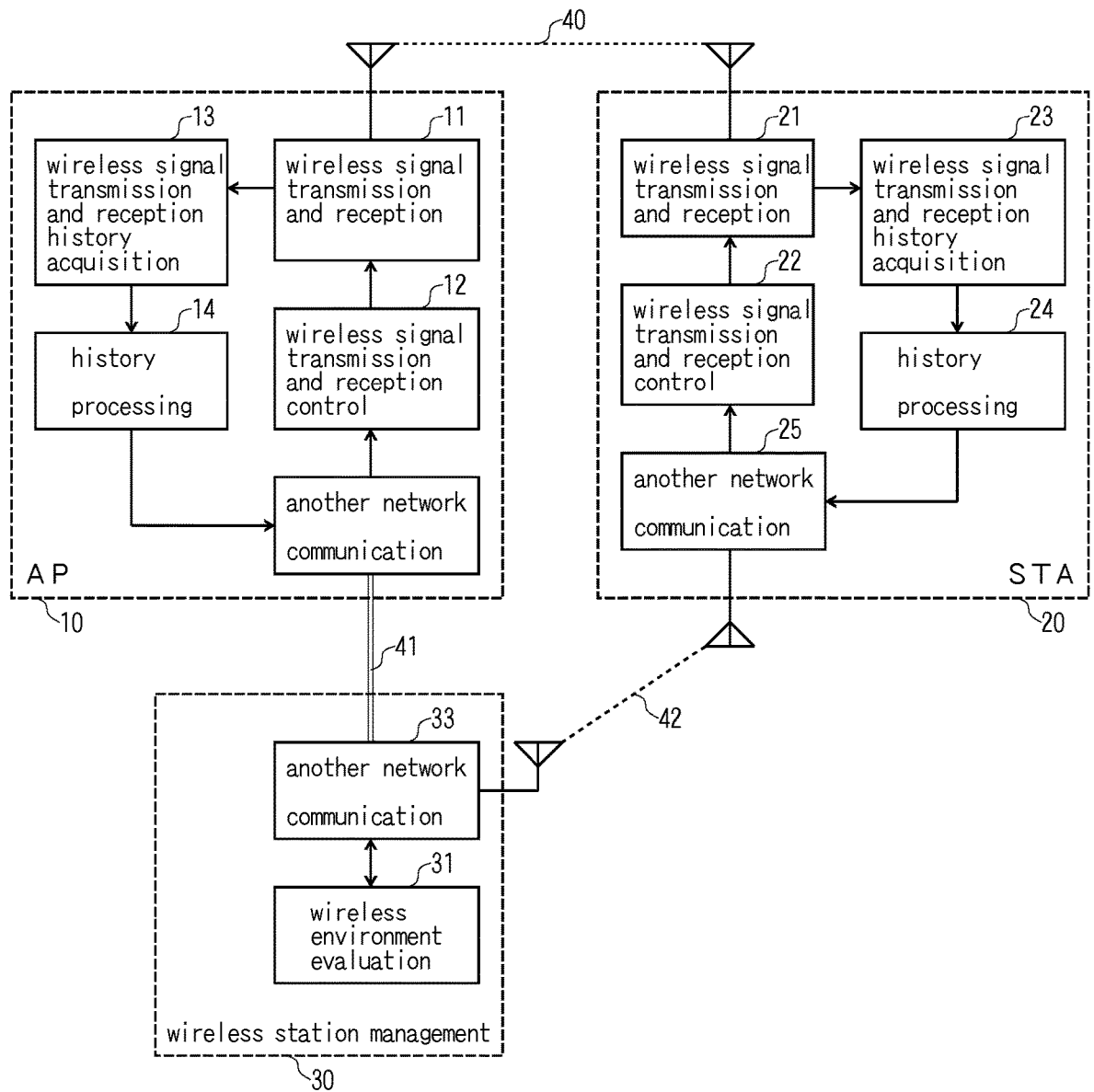
FIG. 3 is a diagram illustrating a third example of the configuration of the wireless communication system according to the present invention.

FIG. 3 illustrates a third example of the configuration of the wireless communication system according to the present invention.

In FIG. 3, in the third example of the configuration, the wireless station managing device 30, which is the same as that in the second example of the configuration, is included, but the wireless station managing device 30 is assumed to be configured to be connected to the AP 10 and the STA 20. The connection between the AP 10 and the wireless station managing device 30 is made over the network 41 in the same manner as in the second example of the configuration. The connection between the STA 20 and the wireless station managing device 30 is made over another network 42 that is different from the network 41. The STA 20 includes another network communication section 25 that is connected to the network 42, and the wireless signal transmission and reception control section 22 and the history processing section 24 are connected to the network communication section 25. The wireless station managing device 30 includes another network communication section 33 instead of the network communication section 32 in the second example of the configuration, and is assumed to be configured to be possibly connected to both the network 41 and the network 42. At this point, the network 42 is assumed to be a wireless network, for example, a mobile network, which is based on a method that is different from the CSMA/CA method. That is, the STA 20 is assumed to be configured to possibly use both the wireless network 40 that is based on the CSMA/CA method and the mobile network as the network 42.

The wireless environment information that is obtained in the history processing section 14 of the AP 10 is sent from the network communication network 16 to the network communication section 33 of the wireless station managing device 30 over the network 41, and is further input into the wireless environment evaluation section 31. The wireless environment information that is obtained in the history processing section 24 of the STA 20 is sent from the network communication section 25 to the network communication section 33 of the wireless station managing device 30 over the network 42, and is further input into the wireless environment evaluation section 31. The control information that is obtained as a result of the determination by the wireless environment evaluation section 31 is sent to the wireless signal transmission and reception control section 12 of the AP 10 over the network 41, and is sent to the wireless signal transmission and reception control section 22 of the STA 20 over the network 42.

An advantage of the wireless communication system that employs the third example of the configuration is that, even in a case where, although communication over the wireless network 40 that is based on the CSMA/CA method between the AP 10 and STA 20 has high latency due to congested or exposed situation, the STA 20 can communicate with the wireless station managing device 30 over the network 42. According to the present invention, a determination is made regarding the exposed situation in the wireless network that is based on the CSMA/CA method which is used by the wireless station, but, in a case where the exposed situation occurs, a case is considered where transmission and reception of data that is used for determination or of data for controlling each wireless station based on the determination cannot be satisfactorily performed over the wireless network 40 that is based on the CSMA/CA method. Therefore, the connection between the STA 20 and the wireless station managing device 30 over the network 42 as in the third example of the configuration can increase the validity of an effect according to the present invention. Furthermore, in a case where a capacity of the network 42 is not in a fully-utilized state, a system capacity can be maximized by directly transmitting and receiving data that is from the STA 20 in the exposed situation to and from the wireless station managing device 30, without involving the wireless network 40 that is based on the CSMA/CA method and the AP 10.

Embodiment 1: Definition of the Exposed Situation and Outline of a Method of Determining the Exposed Situation In the present invention, a situation where, in a reception station, a normal reception rate of a signal from a transmission station is low due to an influence of a hidden wireless station is defined as an "exposed situation in reception," and a situation where, in the transmission station, a transmission opportunity acquisition rate is low due to the influence of the hidden wireless station is defined as an "exposed situation in transmission."

However, as a situation where the normal reception rate is low in the reception station, there is a "congesting situation in reception" where transmission timings for a plurality of transmission stations overlap as will be described below. Therefore, the reception station calculates a degree of the "exposed situation in reception" from the normal reception rate that is acquired, considering the "congesting situation in reception." Furthermore, as a situation where, in the transmission station, the transmission opportunity acquisition rate is low, there is a "congesting situation in transmission" where the number of transmission stations is great as will be described below. However, the transmission station calculates a degree of the "exposed situation in transmission" from the transmission opportunity acquisition rate that is acquired, considering the "congesting situation in transmission."

FIG. 4 illustrates a relationship between the hidden wireless stations and the exposed situation in reception.

In FIG. 4, a case is assumed where a station A, a station B, and a station C that perform the access control that employs the CSMA/CA method, using the same frequency channel are present and where a signal is transmitted from the station B that is the transmission station to the station A that is the reception station, and the normal reception rate in the station A is evaluated.

(1) of FIG. 4 illustrates a case where the station B and the station C are not in a relation of hidden wireless stations with each other. At this time, because the station B and the station C mutually performs the access control that employs the CSMA/CA method, the station C does not perform transmission in S11 in which the station B transmits a signal to the station A. Because of this, in the station A, a signal from the station B can be normally received. However, because in the CSMA/CA method, collision avoidance is performed with random backoff control, in S12 in which transmission timings for the station B and the station C overlap with a certain probability, the signal from the station B cannot be normally received in the station A. In this manner, the normal reception rate of the station A in a case where the station B and the station C are not in a relation of hidden wireless stations with each other depends on a probability that transmission timings for a plurality of wireless stations will overlap. Furthermore, the greater the number of wireless stations in transmission standby, the more the reception rate decreases. Consequently, when the station B and the station C are not in a relation of hidden wireless stations with each other, a situation where the normal reception rate of the station A decreases is the "congesting situation in reception."

(2) of FIG. 4 illustrates a case where the station B and the station C are in a relation of hidden wireless stations with each other. At this time, because the station B and the station C cannot mutually detect a signal, the station B and the station C perform transmission independently of each other. Because of this, there is a high likelihood that a signal from the station B and a signal from the station C will collide with each other as in S13, and the station A cannot normally receive the signal from the station B. On the other hand, when, as in S14, the station C does not transmit a signal, in a case where the station B transmits a signal, the station A can normally receive the signal from the station B. That is, when the station B and the station C are in a relation of hidden wireless stations with each other, a situation where the normal reception rate of the station A decreases is the "exposed situation in reception."

In this manner, as primary causes of a decrease in the normal reception rate of the reception station, there are a congesting situation in reception where there are many wireless stations in transmission standby and where there is a high probability that the transmission timings will overlap, and an exposed situation in reception where an influence of a hidden wireless station is exerted. However, a decrease in the normal reception rate due to the congesting situation in reception results from a parameter of the CSMA/CA, such a decrease takes place in the same manner as in other neighboring wireless stations, and thus the unfairness is not present among wireless stations. On the other hand, the normal reception rate of the reception station that decreases due to the exposed situation in reception tends to be lower than normal reception rates of other neighboring wireless stations that are not in the exposed situation in reception, and thus the unfairness is present among wireless stations.

Therefore, with the following two methods, the degree of the exposed situation in reception by the reception station can be determined.

a1: Comparison is made between a normal reception rate S' that is actually measured and a normal reception rate S in the congesting situation in reception, which is estimated from the number of wireless stations in transmission standby. If S'<S, it is determined that the exposed situation in reception is reached, and it is determined that the greater the degree by which S' is smaller than S, the degree of the exposed situation in reception get higher.

a2: Comparison is made between a normal reception rate S' that is actually measured and a normal reception rate S(i) of other one neighboring wireless station i, which is in the same congesting situation in reception. If S'<S(i), it is determined that the exposed situation in reception is reached, and it is determined that the greater the degree by which S' is smaller than S(i), the degree of the exposed situation in reception get higher.

FIG. 5 illustrates a relationship between the hidden wireless stations and the exposed situation in transmission.

In FIG. 5, a case is assumed where the station A, the station B, and the station C that perform the access control which employs the CSMA/CA method, using the same frequency channel are present and where a signal is transmitted from the station A that is the transmission station, and the transmission opportunity acquisition rate in the station A is evaluated.

(1) of FIG. 5 illustrates a case where the station B and the station C are not in a relation of hidden wireless stations with each other. At this time, because the station A, the station B and the station C mutually perform the access control that employs the CSMA/CA method, the station B, the station A, and the station C acquire a transmission opportunity sequentially in S21, S22, and S23, and transmission opportunity acquisition rates of the stations A, B, and C are the same. However, because bands are equally shared among wireless stations, the greater the number of wireless stations in transmission standby, the more the transmission opportunity acquisition ratio decreases. In this manner, the greater the number of wireless stations in transmission standby, the more the transmission opportunity acquisition rate of the station A in a case where the station B and the station C are not in a relation of hidden wireless stations with each other decreases. Consequently, when the station B and the station C are not in a relation of hidden wireless stations with each other, a situation where the transmission opportunity acquisition rate of the station A decreases is the "congesting situation in transmission."

(2) of FIG. 5 illustrates a case where the station B and the station C are in a relation of hidden wireless stations with each other. At this time, the station B and the station C cannot mutually detect a signal, the station B and the station C perform transmission independently of each other. Because of this, the transmission opportunity acquisition rates are high as in S24 for the station B and S25 for the station C, respectively. On the other hand, it is only in S26 in which the station B and the station C cannot both perform transmission that the station A can acquire a transmission opportunity. That is, when the station B and the station C are in a relation of hidden wireless stations, a situation where the station A has a decreasing transmission opportunity acquisition rate when compared with the station B and the station C is the "exposed situation in transmission."

In this manner, as primary causes of the decrease in the transmission opportunity acquisition rate of the transmission station, there are a congesting situation in transmission where there is a great number of wireless stations in transmission standby, and an exposed situation in transmission where the influence of the hidden wireless station is exerted. However, because the decrease in the transmission opportunity acquisition rate due to the congesting situation in transmission results from transmission opportunities are equally acquired due to the CSMA/CA control, this is also true for other neighboring wireless stations, and thus the unfairness is not present among wireless stations. On the other hand, the transmission opportunity acquisition rate of the transmission station that decreased due to the exposed situation in transmission tends to be lower than the transmission opportunity acquisition rates of the other neighboring wireless stations that are not in the exposed situation in transmission, and thus the unfairness is not present among wireless stations.

Therefore, with the following two methods, the degree of the exposed situation in transmission by the transmission station can be determined.

b1: Comparison is made between a transmission opportunity acquisition rate F' that is actually measured and a transmission opportunity acquisition rate F in the congesting situation in transmission, which is estimated from the number of wireless stations in transmission standby. If F'<F, it is determined that the exposed situation in transmission is reached, and it is determined that the greater the degree by which F' is smaller than F, the degree of the exposed situation in transmission get higher.

b2: Comparison is made between a transmission opportunity acquisition rate F' that is actually measured and a transmission opportunity acquisition rate F of other one neighboring wireless station i, which is in the same congesting situation in transmission. If F'<F(i), it is determined that the exposed situation in transmission is reached, and it is determined that the greater the degree by which F' is smaller than F(i), the degree of the exposed situation in transmission get higher.

(Reversible Relationship and Irreversible Relationship Between the Exposed Situation in Transmission and the Exposed Situation in Reception)

Figure 6:
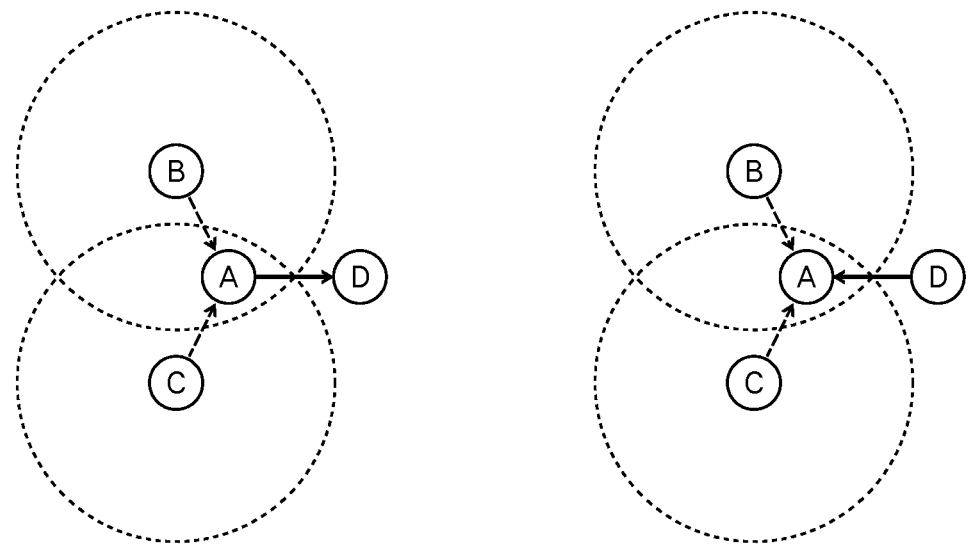
FIG. 6 is a diagram for describing Relationship 1 between the exposed situation in transmission and the exposed situation in reception by a station A.

FIG. 6 is Relationship 1 between the exposed situation in transmission and the exposed situation in reception by the station A.

In FIG. 6, the station A, the station B, the station C, and a station D perform the access control that employs the CSMA/CA method, using the same frequency channel. The station A can detect signals from the station B and the station C. The station B and the station C cannot mutually detect signals and are in a relation of hidden wireless stations with each other. The station D cannot detect signals from the station B and the station C, and the station D, and the station B and the station C are in a relation of hidden wireless stations with each other.

In (1) of FIG. 6, when the station B or the station C transmits a signal, the station A that is the transmission station is in the exposed situation in transmission, and the transmission opportunity acquisition rate decreases. In (2) of FIG. 6, when the station B or the station C transmits a signal, the station A that receives a signal which is transmitted by the station D is in the exposed situation in reception, and the normal reception rate decreases. That is, it is when the station B or the station C transmits a signal that the station A is in the exposed situation in transmission and in the exposed situation in reception.

Figure 7:
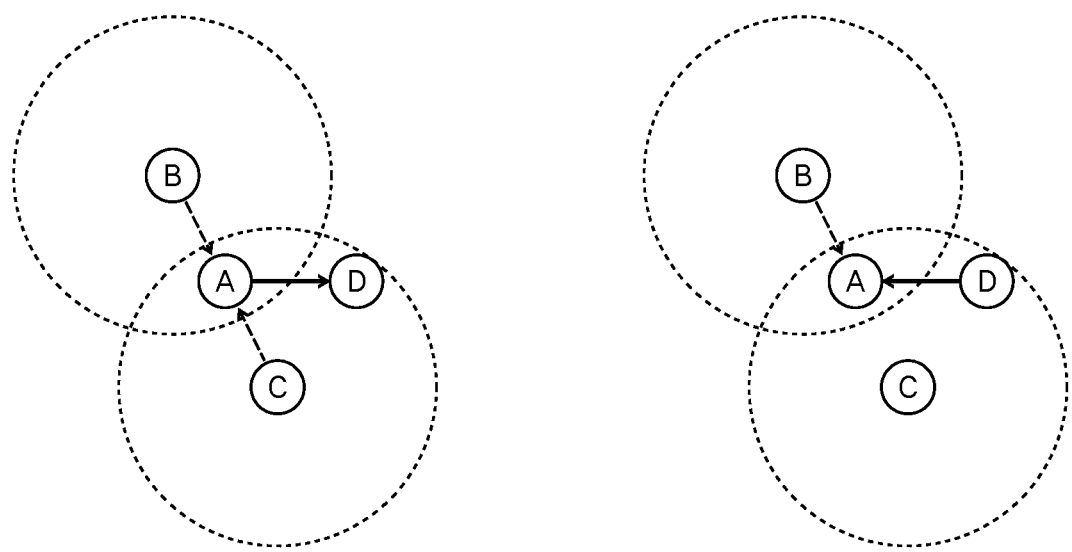
FIG. 7 is a diagram for describing Relationship 2 between the exposed situation in transmission and the exposed situation in reception by the station A.

FIG. 7 is Relationship 2 between the exposed situation in transmission and the exposed situation in reception by the station A.

In FIG. 7, the station A, the station B, the station C, and the station D perform the access control that employs the CSMA/CA method, using the same frequency channel. The station A can detect signals from the station B and the station C. The station B and the station C cannot mutually detect signals and are in a relation of hidden wireless stations with each other. The station D can detect a signal from the station C, but cannot detect a signal from the station B, and the station D and the station B are in a relation of hidden wireless stations with each other.

In (1) of FIG. 7, when the station B or the station C transmits a signal, the station A that is the transmission station is in the exposed situation in transmission, and the transmission opportunity acquisition rate decreases. In (2) of FIG. 7, the station D detects a signal from the station C, and at this time, the station C does not perform transmission. Because of this, when the station B transmits a signal, the station A that receives a signal that is transmitted by the station D is in the exposed situation in reception. That is, it is when the station B or the station C performs transmission that the station A is in the exposed situation in transmission, and it is only when the station B transmits a signal that the station A is in the exposed situation in reception.

Figure 8:
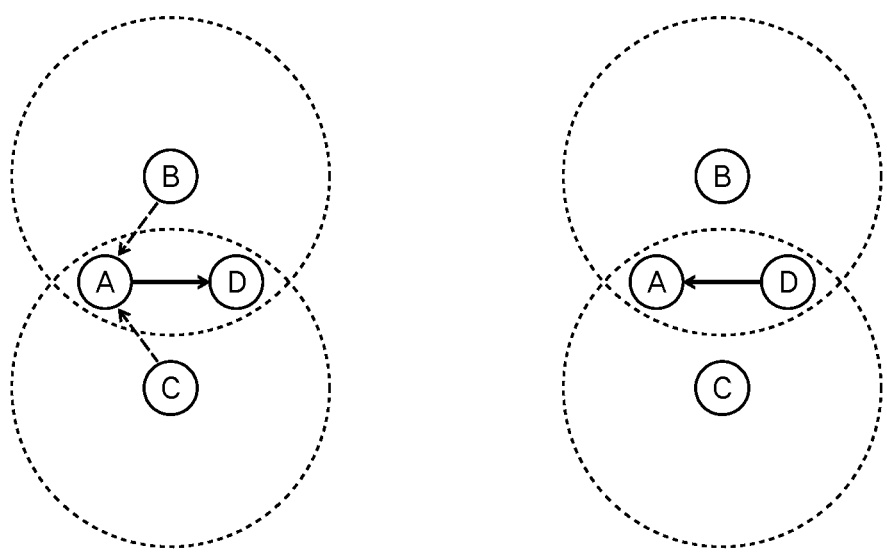
FIG. 8 is a diagram for describing Relationship 3 between the exposed situation in transmission and the exposed situation in reception by station A.

FIG. 8 is Relationship 3 between the exposed situation in transmission and the exposed situation in reception by the station A.

In FIG. 8, the station A, the station B, the station C, and the station D perform the access control that employs the CSMA/CA method, using the same frequency channel. The station A can detect signals from the station B and the station C. However, the station B and the station C cannot mutually detect signals and are in a relation of hidden wireless stations, and the station D can detect signals from the station B and the station C.

In (1) of FIG. 8, when the station B and the station C transmits a signal, the station A that is the transmission station is in the exposed situation in transmission, and the transmission opportunity acquisition rate decreases. In (2) of FIG. 8, the station D detects signals from the station B and the station C, and at this time, the station B and the station C do not perform transmission. Because of this, the station A that receives a signal that is transmitted by the station D is not in the exposed situation in reception. That is, it is when the station B or the station C transmits a signal that the station A is in the exposed situation in transmission, but when receiving a signal from the station D, the station A is not in the exposed situation in reception.

In this manner, in (1) of FIG. 6, (1) of FIG. 7, and (1) of FIG. 8, when the station B or the station C transmits a signal, the station A that is the transmission station is in the exposed situation in transmission. On the other hand, when the station A is the reception station in the same position relationship, the station A is in the exposed situation in reception in (2) of FIG. 6, is in the exposed situation in reception when the station B that is the hidden wireless station only when viewed from the station D that is the transmission station transmits a signal, in (2) of FIG. 7, and is not in the exposed situation in reception in (2) of FIG. 8. That is, although the station A, when it is the transmission station, is in the exposed situation in transmission, the station A, when it is the reception station, is not limited to being in the exposed situation in reception, depending on a surrounding wireless environment. Although not illustrated, in the same manner, although the station A, when it is the reception station, is in the exposed situation in reception, the station A, when it is the transmission station, is not limited to being in the exposed situation in transmission, depending on a surrounding wireless environment.

Therefore, in each wireless station, based on the method a1 or a2, which is described above, there is a need to determine whether or not the exposed situation in reception is reached. Furthermore, based on the method b1 or b2, which is described above, there is a need to determine whether or not the exposed situation in transmission is reached. Based on each of the determinations, there is a need to perform the access control. Furthermore, in a case where only one of the exposed situation in transmission and the exposed situation in reception is clear, there is a need to perform the access control according to such a situation.

(Determination of the Degree of the Exposed Situation in Reception)

Figure 9:
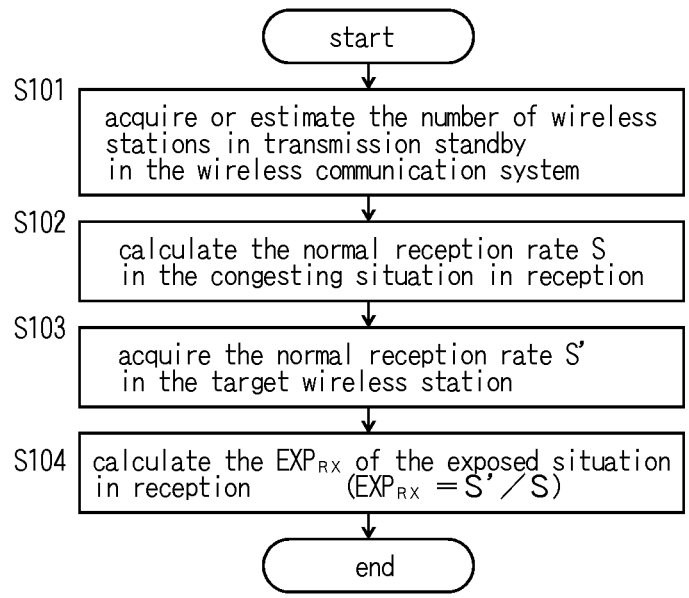
FIG. 9 is a flowchart illustrating an example of a processing procedure for determining a degree of the exposed situation in reception.

FIG. 9 illustrates an example of a processing procedure for determining the degree of the exposed situation in reception. Correspondence to the method a1 described above takes place.

In FIG. 9, the wireless environment evaluation section, which is indicated by 15 in FIGS. 1 and 31 in FIGS. 2 and 3, acquires or estimates the number of wireless stations in transmission standby in the wireless communication system (S101), and calculates the normal reception rate S in the congesting situation in reception according to the number of wireless stations in transmission standby (S102). Next, a normal reception rate S' of a wireless signal in a target wireless station is acquired (S103). Next, comparison is made between the normal reception rate S in the congesting situation in reception and the normal reception rate S' in the target wireless station, and the degree $EXP_{Rx}$ of the exposed situation in reception by the target wireless station is determined based on the following equation (S104).

$$EXP_{RX}=S'/S$$

In a case where $EXP_{Rx}$ is less than 1, that is, in a case where S'<S, it is determined that the exposed situation in reception is reached. Moreover, it can be determined that the smaller a value of $EXP_{Rx}$, the higher the degree of the exposed situation in reception.

At this point, a method of calculating the normal reception rate S in the congesting situation in reception will be described taking the CSMA/CA method in compliance with the IEEE 802.11 standard as an example. It is noted that the normal reception rate S in the congesting situation in reception, as illustrated in S12 in (1) of FIG. 4, corresponds to a probability that the transmission timings for the wireless stations in transmission standby will overlap, and depends on the number of wireless stations in transmission standby.

In the CSMA/CA method, AIFS (AC) in accordance with AC, and CW (Ac, n), which determines a range where a random backoff time is selected according to the AC and a frame retransmission frequency n, are given to a transmission priority called the access category AC and the frame retransmission frequency n of the signal. The normal reception rate S of the signal in the AC and at the frame retransmission frequency n can be calculated based on a prescribed calculation formula or on simulation in which the number M(AC) of wireless stations in transmission standby in the AC, AIFS(AC), and CW(AC, n) are set to be parameters.

A method of examining or estimating the number M(AC) of wireless stations in transmission standby is described.

Method 1: In a case where all wireless stations are managed within the same system and where history information associated with the management is collected, a time at which a signal is transmitted, an amount of transmitted signal, and an access category of the transmitted signal are acquired in the wireless signal transmission and reception history acquisition sections 13 and 23 of the wireless stations, which are illustrated in FIGS. 1, 2, and 3, these relationships are processed in the history processing sections 14 and 24, the resulting relationships are statistically processed in the wireless environment evaluation sections 15 and 31, and thus the number M(AC) of wireless stations in transmission standby in the system can be estimated.

Furthermore, in a case where the AP 10 or the wireless station managing device 30 plays the role of a gateway to traffic between the STA 20 and an external network, a history of the traffic that passes through a gateway portion is used, and thus the number M(AC) of wireless stations in transmission standby can be estimated.

Method 2: In a case where the wireless station that is not managed within the same system is present, the number M(AC) of wireless stations in transmission standby can be estimated from situations in an environment, such as a size of and a population density of an area that is covered by the AP 10 under the management, a location, and a time, or from a situation of the presence of a wireless station that is outside empirical management the results from environmental measurement, such as packet capture. It is noted that, in a case where signal transmission by the wireless station under the management can be interrupted, for example, in a case where the AP 10 interrupts the signal transmission by the AP 10 itself and the slave wireless station, using Quiet IE, or the like among beacons in compliance with the IEEE 802.11 standard, or in a case where, if the wireless station includes another network, an instruction to interrupt the signal transmission over the network that employs the CSMA/CA method is provided from the network that is included, a signal that is detected while the wireless station under the management interrupts the communication is only a signal from the wireless station that is outside the management. Therefore, contents of the signal that, during such period, is detected in the wireless station under the management are analyzed, and thus the number M(AC) of wireless stations in transmission standby can be estimated with high precision.

The number M(AC) of wireless stations in transmission standby, which is estimated in this manner, is used. Thus, the normal reception rate S in the congesting situation in reception can be calculated in Step S102 in FIG. 9, a normal reception rate S' is acquired in Step S103, and comparison is made between the normal reception rate S in the congesting situation in reception and the acquired normal reception rate S' in Step S104. As a result, the wireless station can determine the degree of the exposed situation in reception.

Furthermore, in the method a2 described above, instead of performing Steps S101 and S102 in FIG. 9, the normal reception rate S(i) is acquired that is measured in the neighboring wireless station i that is estimated as being in the same congesting situation in reception, for example, in the STA that belong to the AP. Next, in Step S104, comparison is made between the normal reception rate S(i) of the neighboring wireless station i and the normal reception rate S' that is acquired in the target wireless station, and $EXP_{Rx}(i)$ that is the degree of the exposed situation in reception, of the target wireless station is determined based on the following equation.

$$EXP_{RX}(i)=S'/S(i)$$

In a case where $EXP_{RX}(i)$ is less than 1, that is, in a case where S'<S(i), it is determined that the exposed situation in reception is reached. Moreover, it can be determined that the smaller a value of $EXP_{RX}(i)$, the higher the degree of the exposed situation in reception.

Furthermore, if a signal that is configured in such a manner not to undergo a collision is assumed to be a polling-associated signal or the like which uses PIFS time necessary for determining a channel as being idle, which is stipulated in the IEEE 802.11 standard, and on which the random backoff is not performed, in a case where the normal reception rate S' that is acquired in the reception station is not 100%, it may be determined that the exposed situation in reception occurs and it may be determined that the lower the value, the higher the exposed situation in reception. This method is defined as a3.

Furthermore, differences in the normal reception rate for every channel use time between each of the transmitted signal may be examined. A collision between signals, which occurs in the congesting situation in reception, occurs in a case where another wireless station in transmission standby, which is not in a relation of hidden wireless stations with the transmission station, is present at the time that is the same as the transmission timing for the transmission station. Because of this, the same normal reception rate is available in the reception station that does not have a relationship with a channel use time for a signal. On the other hand, in a case where the exposed situation in reception occurs, the shorter the channel use time a signal has, the lower a collision probability and the higher the normal reception rate. In reverse, the longer the channel use time the signal has, the higher the collision probability and the lower the normal reception rate. Because of this, the normal reception rate is compared against the channel use time, and thus, if there is a difference, it can also be determined that the exposed situation in reception occurs. This method is defined as a4.

(Determination of the Degree of the Exposed Situation in Transmission)

Figure 10:
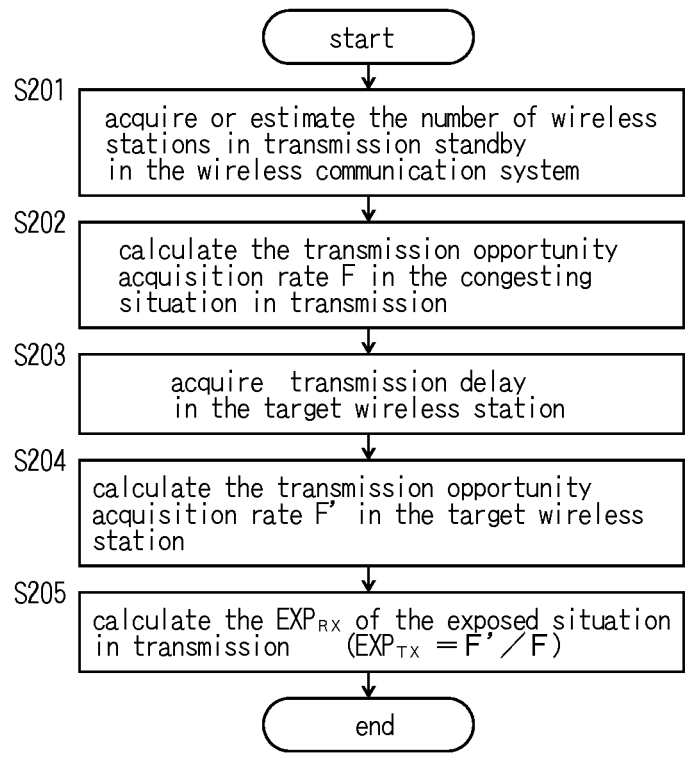
FIG. 10 is a flowchart illustrating an example of a processing procedure for determining a degree of the exposed situation in transmission.

FIG. 10 illustrates an example of a processing procedure for determining the degree of the exposed situation in transmission. Correspondence to the method b1 described above takes place.

In FIG. 10, the wireless environment evaluation section, which is indicated by 15 in FIGS. 1 and 31 in FIGS. 2 and 3, acquires or estimates the number of wireless stations in transmission standby in the wireless communication system (S201), and calculates the transmission opportunity acquisition rate F in the congesting situation in transmission, which corresponds to the number of wireless stations in transmission standby (S202). Next, transmission delay that the target wireless station undergoes is acquired (S203), and the transmission opportunity acquisition rate F' is calculated form the transmission delay that the target wireless station undergoes (S204). Next, comparison is made between the transmission opportunity acquisition rate F in the congesting situation in transmission and the transmission opportunity acquisition rate F' in the target wireless station, and the degree $EXP_{TX}$ of the exposed situation in transmission in the target wireless station is evaluated based on the following equation (S205).

$$EXP_{TX}=F'/F$$

In a case where $EXP_{TX}$ is less than 1, that is, in a case where F'<F, it is determined that the exposed situation in transmission is reached. Moreover, it can be determined that the smaller a value of $EXP_{TX}$, the higher the degree of the exposed situation in transmission.

At this point, when it comes to a method of calculating the transmission opportunity acquisition rate F in the congesting situation in transmission, the transmission opportunity acquisition rate F can be calculated according to the number M(AC) of wireless stations in transmission standby in the AC, in the same manner as in the case where the normal reception rate S in the congesting situation in reception.

Furthermore, the transmission opportunity acquisition rate F' that is calculated from the transmission delay, which is acquired in the wireless station is obtained by the following equation, based on an average transmission opportunity holding duration Hs in the system, an average time $D_M$ of the transmission delay that the wireless station itself undergoes, and an average transmission opportunity holding duration $H_M$ in the wireless station itself.

$$F'=Hs/(D_M+H_M)$$

It is noted that Hs can be acquired in the same procedure as in Method 1 and Method 2 in which the number M(AC) of wireless stations in transmission standby is estimated, and $D_M$ and $H_M$ can be acquired with Method 1 in which the number M(AC) of wireless stations in transmission standby is estimated, or in the wireless signal transmission and reception history acquisition section of the wireless station itself.

Furthermore, in the method b2 described above, instead of performing Steps S201 and S202 in FIG. 10, the transmission opportunity acquisition rate F(i) of the neighboring wireless station i that is estimated as being in the same congesting situation in transmission, for example, the STA that belongs to the AP, is acquired, comparison is made in Step S205 between the transmission opportunity acquisition rate F(i) of the neighboring wireless station i and the transmission opportunity acquisition rate F' that is calculated from the transmission delay acquired in the target wireless station, and the degree $EXP_{TX}(i)$ of the exposed situation in transmission in the target wireless station is evaluated based on the following equation.

$$EXP_{TX}(i)=F'/F(i)$$

In a case where $EXP_{TX}(i)$ is less than 1, that is, in a case where F'<F(i), it is determined that the exposed situation in transmission is reached. Moreover, it can be determined that the lower a value of $EXP_{TX}(i)$, the higher the degree of the exposed situation in transmission.

At this point, when it comes to the comparison between the transmission opportunity acquisition rate F(i) of the neighboring wireless station i and the transmission opportunity acquisition rate F' of the target wireless station, because the average transmission opportunity holding duration Hs in the system takes the same value, although comparison with a value of $D_M+H_M$ is made, the exposed situation in transmission can be determined.

Furthermore, when considered from a perspective of a time for which a channel can be determined as being idle and of a backoff time thereof, because, when it is determined that a channel is idle, a signal can be reliably transmitted, a signal that does not compete with a signal from another wireless station for transmission can be prevented from being influenced by the congesting situation in transmission, regarding information on the transmission delay. For example, if a polling-associated signal or the like is assumed which uses the PIFS time necessary for determining a channel as being idle, which is stipulated in the IEEE 802.11 standard, and on which the random backoff is not performed, when it is determined that a channel is idle, a signal can be reliably transmitted. When it comes to the transmission delay that occurs if the congesting situation in transmission is assumed, an average time of the transmission delay is one-half of the average transmission opportunity holding duration Hs in the system. Consequently, in a case where a reference time that is one-half of the average transmission opportunity holding duration Hs in the system is subtracted from an average time $D_M'$ of the transmission delay that the wireless station itself undergoes and where a resulting value exceeds 0, a determination as the exposed situation in transmission can be made and it can be determined that the greater the resulting value, the higher the degree of the exposed situation in transmission. This method is defined as b3.

Furthermore, in a case where a transmission signal from the wireless station does not compete with a signal form another wireless station with a probability according to the access category AC and the frame retransmission frequency n, comparison is made between the average time $D_M'$ of the transmission delay that the wireless station itself undergoes, which is calculated using only a signal that has a low level of probability, among signals that are arranged in order of increasing probability in statistics for the transmission delay, and the time that is one-half of the average transmission opportunity holding duration Hs in the system, using the same method described above, and thus the exposed situation in transmission can be determined. This method is defined b4.

Embodiment 2: Statistical Processing Method of Acquiring the Normal Reception Rate, and the Transmission Delay or the Transmission Opportunity Acquisition Rate As described in Embodiment 1, information that is the normal reception rate is necessary for determining the degree of the exposed situation in reception, and information that is the transmission delay or the transmission opportunity acquisition rate is necessary for determining the degree of the exposed situation in transmission.

Figure 11:
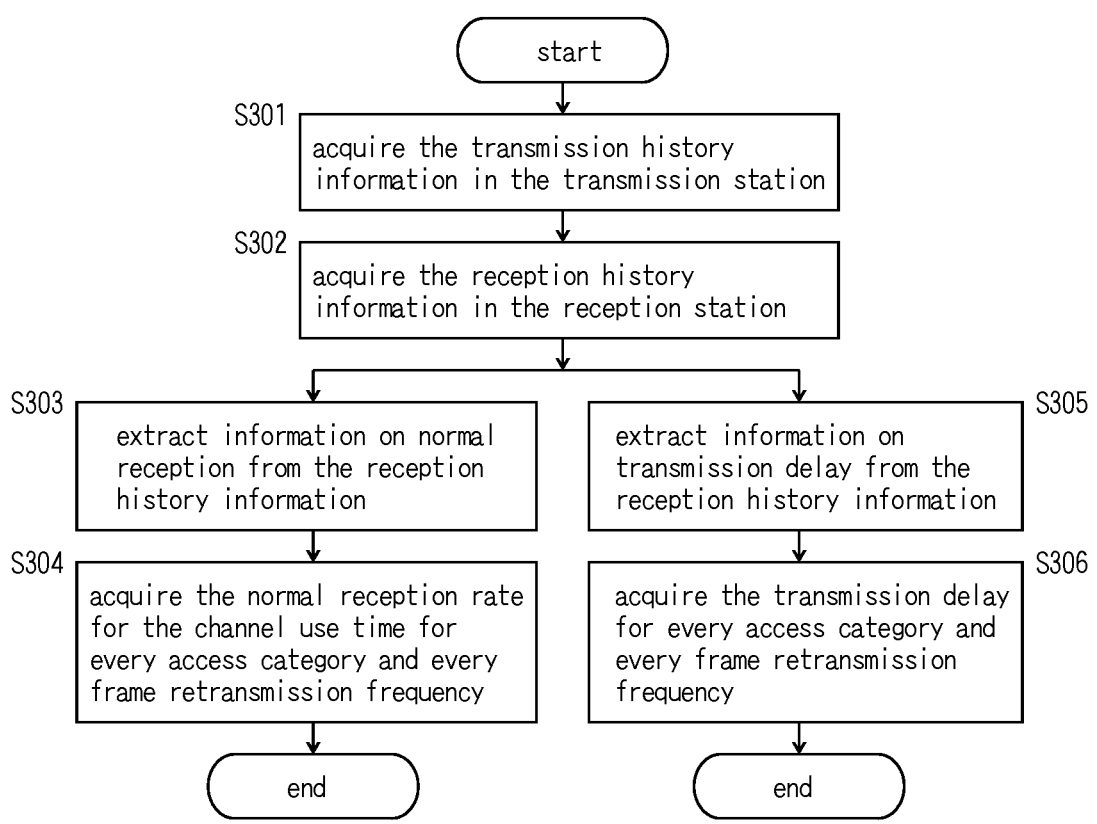
FIG. 11 is a flowchart illustrating an example of a procedure for statistical processing that acquires a normal reception rate and a transmission delay.

FIG. 11 illustrates an example of a processing procedure for a statistical processing method of acquiring the normal reception rate and the transmission delay in Embodiment 2.

In FIG. 11, information that is a transmission history in the transmission station is acquired (S301), and information that is a reception history in the reception station is acquired (S302). Next, information on normal reception is extracted from each of the acquired reception history information (S303), and a channel use time for every access category and every frame retransmission frequency is statistically processed and thus the normal reception rate for the channel use time is acquired (S304). Alternatively, information that is the transmission delay is extracted from each of the acquired transmission history information (S305), and the statistical processing is performed for every access category and every frame retransmission frequency and thus the transmission delay is acquired (S306).

First, S303 and S304 in the statistical processing method of calculating the normal reception rate for the channel use time will be described with reference to FIG. 12.

(1) of FIG. of 12 illustrates an example in which, for a signal in a format that is receivable in the reception station, of the signals that are transmitted by the transmission station, pieces of information, such as access categories AC VO, AC BE and so forth, frame retransmission frequencies 0, 1, and so forth, channel use times e, f, and so forth, and normal reception OK, NG, and so forth, are recorded at times T1, T2, and so forth, respectively. It is noted that the transmission station is assumed to perform transmission in a format of a signal that is receivable in the reception station. In the IEEE 802.11 standard, an MCS that is a combination of a modulation method and an error correcting code rate that correspond to a transfer rate is predetermined, and whether or not the normal reception is possible changes depending on situations such as the strength of a radio wave and noise that is received in the reception station. Because of this, the transmission station redetermines the transfer rate or the MCS set according to such a situation. Basically, of the signals from the transmission station, a signal that has a transfer rate lower than a transfer rate at which the wireless station itself can perform normal reception, or a signal that has an MCS lower than an MCS at which the wireless station itself can perform normal reception can be normally received although not destined for the wireless station itself. Because of this, information on whether or not these signals can also be normally received in a format of a signal that is receivable by the reception station is acquired and thus an amount of information that is used for the statistical processing can be increased.

This information that is recorded is statistically processed in order to calculate the normal reception rate. As the statistical processing method, as illustrated in an example in (2) of FIG. 12, a method of calculating normal reception rates C, D, and so forth for a signal that needs a channel use time within a fixed range, for every access category and every frame retransmission frequency is given. If the exposed situation in reception is assumed, it is expected that the normal reception rate changes according to the channel use time, but the channel use time takes various values according to a length of or a transfer rate of a signal. Because of this, there is a concern that the number of statistical parameters for the normal reception rate for every channel use time will be small. Thus, a division into channel use times within a fixed range is made, statistics are gathered, and thus the degree of the exposed situation in reception can be determined from the normal reception rate for every channel use time within the fixed range.

Next, S305 and S306 in a statistical processing method of acquiring the transmission delay will be described with reference to FIG. 13.

(1) of FIG. 13 illustrates an example in which, for a signal in a format that is receivable in the reception station, of the signals that are transmitted by the transmission station, pieces of information, such as access categories AC VO, AC BE and so forth, frame retransmission frequencies 0, 1, and so forth, and transmission delays a, b, and so forth, are recorded at times T1, T2, and so forth, respectively. There is a method in which an average value of transmission opportunity acquisition rate is obtained by calculating an average time of the transmission delay for every access category and every frame retransmission frequency, using these recorded pieces of information. On the other hand, as illustrated in an example in (2) of FIG. 13, in a case where the transmission delay and signal ratios α, β and so forth of the transmission delay are retained as a histogram, and where, as illustrated in (3) of FIG. 13, an accumulation distribution is graphed with respect to the transmission delay, as in the method b4 that is described in Embodiment 1, comparison is made between the average time $D_M'$ of the transmission delay that the wireless station itself undergoes, which is calculated using only a signal that has a low level of probability, among signals that are arranged in order of increasing probability regarding statistics on the transmission delay, and the time that is one-half of the average transmission opportunity holding duration Hs in the system, and this can be used as the method of determining the exposed situation in transmission.

Next, a method of acquiring the information that is the transmission delay will be described below with respect to FIGS. 14 to 15.

FIG. 14 illustrates an example in which, for signal IDs A, B, and so forth of signals that are transmitted in the transmission station, pieces of information are recorded such as access categories AC VO, AC BE and so forth, frame retransmission frequencies 0, 1, and so forth, channel use times e, f, and so forth, transmission preparation completion times TT1, TT2, and so forth, transmission start times T1, T2, and so forth, and reception station reception approvals OK, OK, and so forth, respectively. Although the signal ID is one by which a signal can be uniquely identified, this poses no problem. The signal ID may be an ID that is specially prepared, and may be information that is a timestamp which is included in a signal, or information that is a transmission time or reception time of a signal. It is noted that, in a case where a sequence number in a signal in compliance with the IEEE 802.11 standard is used as the signal ID, if a signal having the same contents is retransmitted, in some cases, sequence numbers are the same. Therefore, because there is a likelihood that a plurality of signals will be present for one sequence number, limitation to a signal of which retransmission is not performed is imposed using information on the availability and unavailability of retransmission. Thus, a unique determination can be made.

The possibility or impossibility of reception by the reception station is determined by whether or not reception station can perform reception, by making comparison between information on the transfer rate and the MCS of the signal that is transmitted by the transmission station, and information on the transfer rate and the MCS at which the reception station is considered to be able to perform reception. If the system that can change a beam direction of a transmission signal is assumed, there is a need to determine whether or not the reception station can perform reception according to the change of the direction. The transmission delay is obtained by subtracting the transmission preparation completion time from the transmission start time.

Furthermore, in an example in FIG. 14, only information relating to normal reception, which is necessary for determination of the exposed situation in reception, is insufficient in the transmission station. This is because information on a signal ID of a signal from the transmission station, which is normally received in the reception station, is recorded and the recorded information is matched to information on a signal that is determined as being receivable as a result of determination of whether or not the reception transmission can perform reception, among pieces of information that are retained in the transmission station. Then, regardless of a signal being receivable as a result of determination of whether or not the reception transmission can perform reception, it can be determined that a signal, information on which is not present in the signal ID of the signal that is normally received in the reception station, cannot be normally received. Therefore, there is a need to perform matching of information on the exposed situation in reception to information in the transmission station.

For example, in a case where the wireless environment evaluation section is present in the transmission station, and so forth, using information in FIG. 14, information can be shared without using to the utmost a band for a network that employs the CSMA/CA method or for another network, and the exposed situation in transmission and the exposed situation in reception can be determined.

FIG. 15 illustrates an example in which, in the transmission station, only pieces of information of transmitted signals are prepared such as IDs A, B, and so forth, transmission preparation completion times TT1, TT2, and so forth, and possibility and impossibility of reception by a reception station OK, OK, and so forth and in which, in the reception station, pieces of information are recorded such as signal IDs A, B, and so forth, access categories AC VO, AC BE, and so forth, frame retransmission frequencies 0, 1, and so forth, channel use times e, f, and so forth, and transmission start times T1, T2, and so forth, respectively. It is noted that, because propagation delay of a signal from the transmission station to the reception station is considerably small, although the reception start time in the reception station is replaced with the transmission start time, this posed no problem. Furthermore, it is noted that, in a case where a time stamp of the reception start time of a reception signal, along with contents of a signal, is recorded in the transmission and reception history, although the transmission delay is obtained by subtracting the transmission preparation completion time from the reception start time, this poses no problem. It is noted that, in the present method, because only information on a signal that is normally received in the reception station can be acquired, in a case where the reception station is in the congesting situation in reception or in the exposed situation in reception, an amount of information on the exposed situation in transmission by the transmission station, which can be acquired, is small, in some cases, it takes time to gather statistics.

For example, in a case where the wireless environment evaluation section is present in the reception station, and so forth, using information in FIG. 15, information can be shared without using to the utmost a band for a network that employs the CSMA/CA method or for another network.

Because tables that are illustrated in (1) of FIG. 12 and (1) of FIG. 13 can be created using information that is illustrated in FIGS. 14 and 15, the degree of the exposed situation in transmission by the transmission station and the degree of the exposed situation in reception by the reception station can be determined. This method is performed even in a case where the transmission station and the reception station are changed to the reception station and the transmission station, respectively, in terms of relationship with each other, and thus both of the exposed situation in transmission and the exposed situation in reception can be made clear in a certain wireless station.

It is noted that a method of acquiring information is not limited to methods that are illustrated in FIGS. 14 and 15 and that if pieces of information can be all collected, although any of the transmission station and the reception station collects these piece of information, this poses no problem.

Embodiment 3: Example of Use of a Beacon Signal that is Transmitted by the AP

In Embodiment 3, an example is described in which a beacon signal that the AP periodically transmits is used as a signal for acquiring the normal reception rate in Embodiment 1 and the transmission delay in Embodiment 2.

Figure 16:
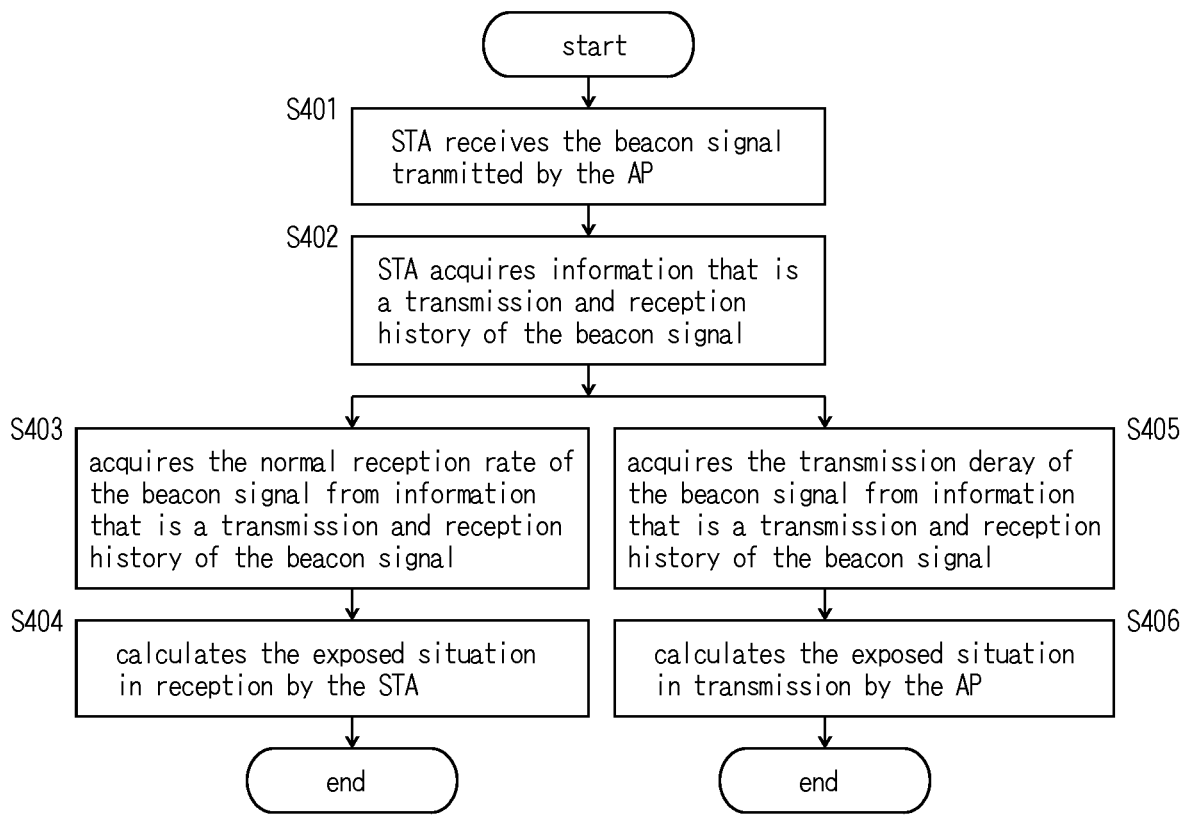
FIG. 16 illustrates a flowchart illustrating a procedure for processing that determines the exposed situation in transmission and the exposed situation in reception using a beacon signal.

FIG. 16 illustrates an example of a procedure for processing the exposed situation in transmission and the exposed situation in reception using the beacon signal.

In FIG. 16, the STA receives the beacon signal that is transmitted by the AP (S401), acquires information that is a transmission and reception history of the beacon signal (S402), acquires a normal reception rate of the beacon signal from the information that is the transmission and reception history of the beacon signal (S403), and calculates the degree of the exposed situation in reception by the STA (S404). Furthermore, the transmission delay of the beacon signal is acquired from the information that is the transmission and reception history of the beacon signal (S405), and the degree of the exposed situation in transmission by the AP is calculated (S406).

In compliance with the IEEE 802.11 standard, the AP periodically broadcasts the beacon signal to the STA for the purpose of sharing an agreement relating to signal transmission and reception, and for other purposes. With this signal, information is shared among all STAs that possibly communicate with the AP. Because of this, it can be considered that the beacon signal from the AP to which a wireless station belongs as an STA is receivable regardless of the transfer rate and the MCS and that all the beacon signals are receivable.

Furthermore, also in some cases, an amount of information that is included in the beacon signal neither increases, nor decreases. In such a case, it can be considered that the channel use time is fixed without the channel use time being changed for the transmission thereof.

Furthermore, the transmission of the beacon signal is periodically performed, a transmission interval TBTT of the beacon signal in compliance with the IEEE 802.11 standard is scheduled. Because information relating to a periodicity with which a beacon is transmitted, that is, a beacon interval is included in the beacon signal, a station, although not a station that transmits the beacon signal, can determines the TBTT. Because of this, a station that receives the beacon signal can acquire a beacon transmission schedule time. Furthermore, in some cases, the beacon signal is basically transmitted with a specific priority, and is transmitted with a high priority at a specific timing. Because information with which the specific priority is possibly determined is also included in the beacon, it is also possible that the priority is acquired in the STA.

Therefore, in the STA that belongs to the AP which transmits the beacon signal and thus receives the beacon signal, the transmission preparation completion time and the transmission start time, which are pieces of information that are acquired in the AP in FIG. 15, can also be acquired in the STA. At this time, because the possibility and impossibility of reception by the reception station does not need to be considered, various pieces of information that are illustrated in FIG. 15 are collectible only in the STA. At this time, in a case where the time stamp of the transmission start time is recorded in the beacon signal, the transmission delay can be obtained by subtracting the transmission preparation completion time from the transmission start time thereof. Therefore, although the AP does not support the method that is proposed according to the present invention, if the STA supports the method, in some cases, the exposed situation in transmission by the AP and the exposed situation in reception by the STA itself can be acquired with the information that is obtained from the beacon signal.

Furthermore, the beacon signal is transmitted at the lowest transfer rate and the lowest MCS at which communication is possible, which are supported in the AP. Because of this, although the transmitted beacon signal is a beacon signal from the AP to which the STA itself does not belong, if the transmitted beacon signal has a relationship in which communication is possible, it is possible that the transmitted beacon signal is normally received.

It is noted that, because the beacon signal is not retransmitted, although acquisition of information on retransmission frequency is not performed, this poses no problem. Furthermore, in a case where a priority of the beacon signal does not change, although the priority is considered to be fixed, this poses no problem. Furthermore, in a case where the channel use time of the beacon signal is set to be fixed, there is no need to acquire a history in formats as in (1) of FIG. 12 and (2) of FIG. 12 and to perform the statistical processing, and only information on whether or not the beacon that has to be only transmitted can be received may be recorded at every time.

Figure 17:
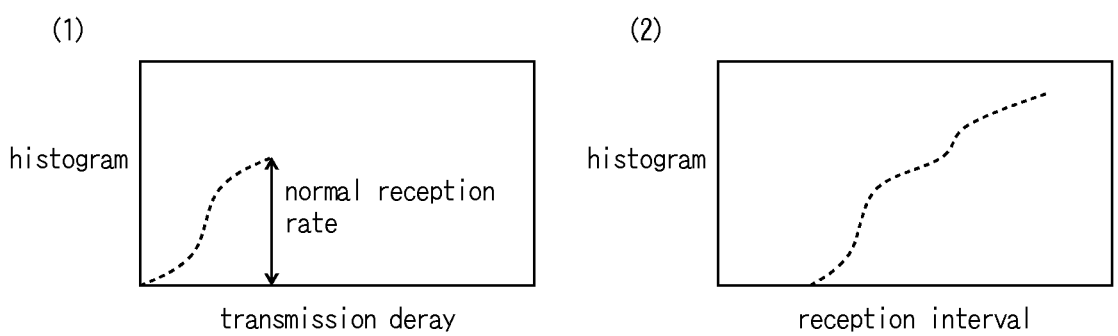
FIG. 17 is a diagram illustrating accumulation distribution of the transmission delay and a reception interval of a beacon signal.

(1) of FIG. 17 illustrates an example in which accumulation distribution of the transmission delays of the beacon signal is graphed. Only in a case where the beacon signal can be received, the STA can record the transmission delay. Consequently, a height on the vertical axis representing the distribution that can be recorded indicates the normal reception rate, and a portion that cannot be recorded indicates a rate at which the normal reception cannot be performed. That, the exposed situation in transmission by the AP and the exposed situation in reception by the STA can be determined from one graph.

Furthermore, attributes of the beacon signal, which are periodically transmitted, may be used, and the beacon signal may be retained as information on the reception interval of the beacon signal as illustrated in (2) of FIG. 17. This is because, if there is a high dispersion in the reception interval of the beacon signal, it can be determined that the exposed situation in transmission by the AP occurs. Besides, if the exposed situation in reception occurs in the STA, information on how many times the beacon signal can be normally received successively is easily expressed using the fact that the reception interval increases to integral multiple of the beacon interval, and thus the frequency with which the situation occurs can be acquired.

In a case where the method described above is used, the exposed situation in transmission by the AP and the exposed situation in reception by the STA can be acquired. However, because only the AP transmits the beacon, the exposed situation in transmission by the STA and the exposed situation in reception by the AP in response to the transmission by the STA cannot be estimated. However, in a case where it is determined that the beacon signal from another AP to which the STA does not belong is possibly received, in some cases, the exposed situation in transmission by the STA can be estimated as follows. It is a case in which it is determined that the AP is in the exposed situation in transmission and that the STA itself is not in the exposed situation in reception. At this time, in a case where the beacon signal from another AP that is not in the exposed situation in transmission can be received in a condition in which it is determined that the normal reception can be performed in the STA itself, if as a result of the determination from the beacon signal, the STA itself is not in the exposed situation in reception, it can be determined, depending on situations in FIG. 6 or 7, that the AP is in the exposed situation in transmission. Furthermore, it can be determined that the STA itself is not in the exposed situation in transmission and that the AP is in the exposed situation in reception in response to the transmission signal from the STA itself.

Embodiment 4: Example of Use of a Test Packet for Determination of the Exposed Situation In Embodiment 4, an example is described in which, Embodiment 1 and Embodiment 2, a test packet that is created for determination of the exposed situation is used as a signal for acquiring the normal reception rate and the transmission delay.

Figure 18:
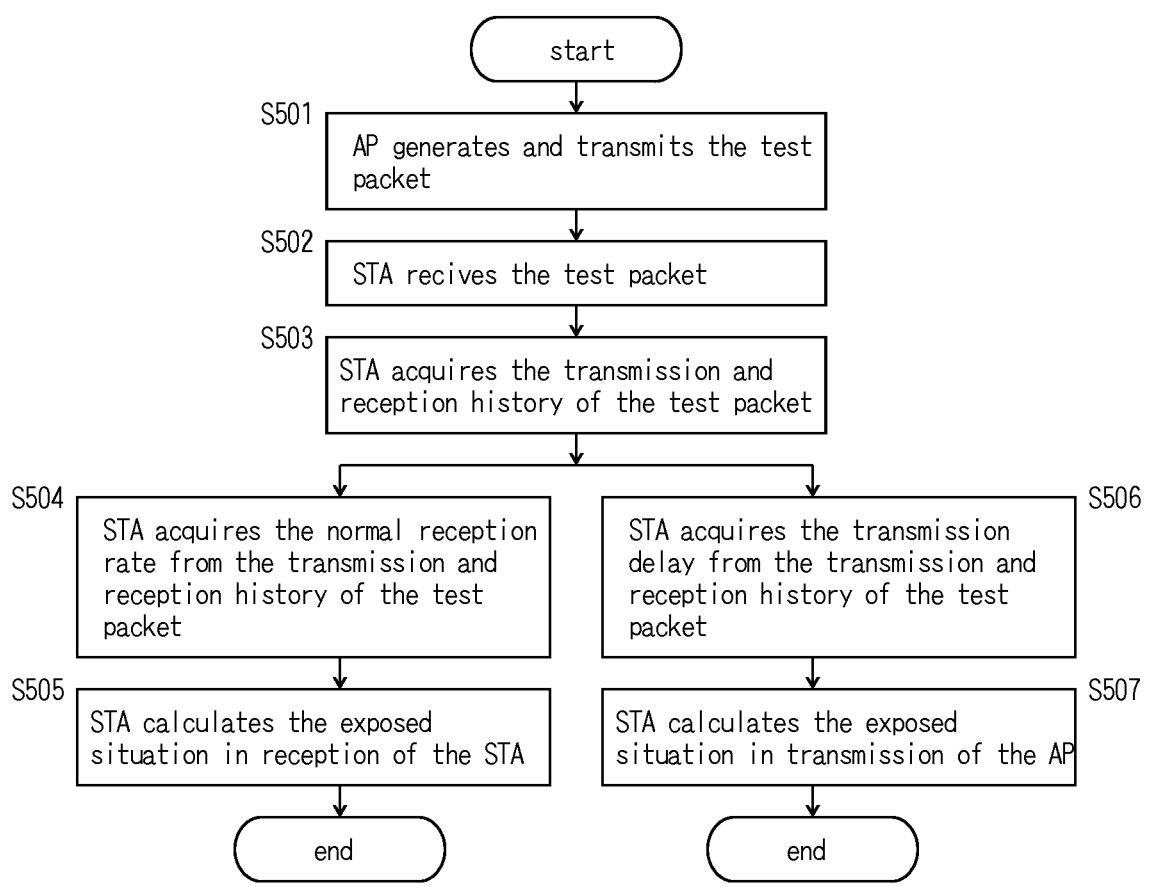
FIG. 18 is a flowchart illustrating an example of a procedure for determination of the exposed situation in transmission and the exposed situation in reception using a text packet.

FIG. 18 illustrates a procedure for processing that determines the exposed situation in transmission by the AP and the exposed situation in reception by the STA using a test packet.

In FIG. 18, the AP generates the test packet and transmits the generated test packet (S501), and the STA receives the test packet (S502), acquires information that is a transmission and reception history of the test packet (S503), acquires the normal reception rate from the information that is the transmission and reception history of the test packet (S504), and calculates the degree of the exposed situation in reception by the STA (S505). Furthermore, the transmission delay is acquired from the information that is the transmission and reception history of the test packet (S506), and the degree of the exposed situation in transmission by the AP is calculated (S507).

Because the test packet is specially created for the determination of the exposed situation, the test packet is possibly created in a condition in which each exposed situation is easy to estimate. Furthermore, information that is necessary for the determination of the exposed situation, but cannot be acquired in the reception station, for example, a time at which, regarding the transmission preparation completion, the transmission preparation is completed in the transmission station is placed on the test packet in the signal.

Alternatively, a time at which the transmission preparation will be completed is expected and the expected time is placed on the test packet in the signal. Accordingly, the transmission and reception history acquisition section of the reception station reads contents of the signal, and thus the transmission preparation completion time of the signal can also be acquired or estimated in the reception station.

Furthermore, pieces of information, such as the transmission preparation completion time, the transmission start time, and the reception start time, which are described above, for example, are pieces of information in a low-level layer, which is called a MAC layer in the wireless station that complies with the IEEE 802.11 standard. In some cases, the information in the low-level information is difficult to acquire. Thus, in the present embodiment, a method is described in which various types of processing are performed with an application layer in such a manner that the exposed situation can be estimated with a higher-level layer, and in which information of the MAC layer is estimated.

An arrival delay from creation of the test packet with the application layer in the transmission station to arrival of the created test packet at an application layer in the reception station is a time that results from adding up d1 to d6 that follow.

d1: The time from the creation of the test packet with the application layer to the arrival of the created test packet at the MAC layer d2: The time required for the created test packet that arrives at the MAC layer to be completely prepared for transmission d3: The time required for the created test packet that is completely prepared for transmission to start to be transmitted, that is, a transmission delay in the MAC layer d4: The time required for retransmission processing in a case where the retransmission in the MAC layer takes place d5: The time required for the created test packet that starts to be transmitted to be completely received in the reception station, that is, the channel use time in the MAC layer d6: the time required for the created test packet that is completely received in the reception station to arrive at the application layer In contrast with d3, d4, and d5, d1 and d6 can be dealt with in a negligible manner. In a case where other signals are not accumulated in a transmission buffer in the transmission station, d2 can be dealt with in a negligible manner. Therefore, recommendations are made as follows.

The number of test packets is such that signals are not accumulated in the transmission buffer Signals that are accumulated in the transmission buffer when the test packet arrives are erased A structure in which the test packet is inserted into the frontmost row in the transmission buffer is employed The transmission buffer dedicated for the test buffer is employed d2 can be neglected according to the above recommendations or the like. Furthermore, because d5 can be easily calculated from a packet length of the test packet and the transfer rate or the MCS, the time d3+d4 is possibly estimated by taking a measure to deal with d2.

Then, in a case where the packet cannot be received in the application layer in the reception station, that is, in a case where a packet loss occurs, this means that the packet cannot be normally received in the wireless signal transmission and reception section of the reception station due to successive exceeding of a retransmission upper-limit frequency that is configured in the MAC layer. Therefore, in a case where a packet loss rate and the retransmission upper-limit frequency are defined as L and as MAX, respectively, the normal reception rate S in the MAC layer is measurable by the following equation.

$$L = (1-S)^{MAX+1}$$

The exposed situation in reception can be determined with the methods in Embodiment 1 and Embodiment 2, using the normal reception rate S.

Furthermore, in a case where the normal reception rate is not 100%, because the retransmission in the MAC layer takes place, information on d4 is included in statistics on an arrival delay. Therefore, by limiting the use of data to using only the high normal reception rate S from the shortest to the longest of the arrival delay of the arrival delay statistics retained in the application layer, it becomes possible to extract information of arrival delay concerning d3 only, excluding the information of d4. Because the transmission delay in the MAC layer can be estimated in this manner, the exposed situation in transmission can be determined with the methods in Embodiment 1 and Embodiment 2.

In the present embodiment, it is noted that a packet creation time is entered into a payload portion of a packet in such a manner that in the reception station, a time at which the transmission station creates the test packet with the application layer can be acquired, that information, such as a generation interval of the packet or a creation number of the packet is entered in the payload portion in such a manner that it can also be determined whether the reception can be normally performed, and thus that the normal reception rate and the transmission delay can be obtained only in the reception station.

In the method described above, with the introduction of the application, the exposed situation in transmission and the exposed situation in reception are possibly estimated. This method is performed even in the case where the transmission station and the reception station are changed to the reception station and the transmission station, respectively, in terms of relationship with each other, and thus both of the exposed situation in transmission and the exposed situation in reception can be made clear in a certain wireless station.

Embodiment 5: Improvement in the Precision of and the Effectiveness of the Determination of the Exposed Situation In Embodiment 5, a scheme is described in which, in a case where the beacon signal in Embodiment 3 is used, and in a case where the test packet in Embodiment 4 is used, the precision of the determination of the exposed situation and the effectiveness of the determination are increased.

In the method a3, which is described in Embodiment 1, as a signal that is configured in such a manner as not to undergo a collision, a signal that does not compete with a signal from another wireless station at the time of transmission, specifically, a beacon signal that is transmitted at a timing at which a CFP duration starts, in compliance with the IEEE 802.11 standard is used considering a time for which a channel can be determined as being idle and a backoff time thereof. The beacon signal is a signal which uses the PIFS time as the time necessary for determining a channel as being idle and on which the random-backoff is not performed. Because of this, in a case where the normal reception rate is not 100% in the reception station, it can be determined that the exposed situation in reception occurs. Furthermore, in method b3, in a case where the reference time that is one-half of the average transmission opportunity holding duration Hs in the system is subtracted from the average time $D_M{}^I$ of the transmission delay that the wireless station itself undergoes and where a resulting value exceeds 0, the determination as the exposed situation in transmission can be made. Therefore, in a case where the beacon signal is used, because there is no need to consider the congesting situation in reception and the congesting situation in transmission, an error due to estimation of the number M(AC) of wireless stations in transmission standby in the system is not included. Therefore, the transmission timing of the beacon signal is set to be a start of the CFP duration, and thus the precision of the determination of the exposed situation can be improved.

Because the higher the priority of the signal transmission, the more the effect of the congesting situation in transmission can be reduced, the error due to the estimation of the number M(AC) of wireless stations that undergoes the deferral transmission in the system can be diminished. Therefore, the precision of the determination of the exposed situation in transmission can be improved by using a signal in an AC VO class that is an access category that has the highest priority in the IEEE 802.11 standard. It is noted that for the beacon signal in the system to which the concept of the access category can apply, the AC VO class is used. Furthermore, because the AC VO class is an access category for audio data, for example, test packet that behaves like the voice data is created, and thus the priority of the test packet is possibly increased.

Moreover, transmission frequencies of the beacon signal and the test packet are devised. For example, the beacon signal is transmitted in every beacon interval, but in most cases, the beacon interval is configured to be a time such as 100 msec. In this case, only 10 signals are transmitted for one second. Therefore, because it takes time to perform a statistical operation, the beacon interval may be shortened in such a manner that a large amount of information can be acquired for a short period of time. This is also the same for the test packet. It is noted that, when a transmission interval is shorted, consideration needs to be given to a reduction in a band that is available to another signal, and that, in a case where the test packet is created with the application layer, there is a need to consider to accumulate signals in the transmission buffer.

Furthermore, in the method a4 that is described in Embodiment 1, a difference between normal reception rates for every channel use time of a signal that is transmitted is examined and thus the exposed situation in reception can be determined. Because of this, the precision of the determination of the exposed situation in reception can be improved by causing the channel use times of the beacon signal and the test packet to be changed. It is noted that, because the channel use time requires much time, for example, a load that accompanies the statistical processing can be reduced by imposing a limitation to a fixed channel use time, for example, to two types or three types. Furthermore, in a case where a normal reception rate that is assumed if a short signal is used as in an RTS/CTS method in the IEEE 802.11 standard or a normal reception rate of a signal that is lengthened due to an aggregation of frames wants to be acquired, the beacon signal or the test packet that results from adding the channel use time to those signals may be created, and the exposed situation in reception may be estimated.

Embodiment 6

A method according to the present invention may be implemented only at a timing at which the exposed situation is suspected of being present. As the timing at which the exposed situation is suspected to be present, the following example are given.

Retransmission rate is high

Throughput is low

Delay of traffic is high

In the wireless communication system according to the present invention, because a history is matched using a CSMA/CA network or an individual network and the statistical processing is performed, there is a need to transmit statistical information to the wireless environment evaluation section, and a load is applied to the network. Furthermore, in a case where the beacon signal or the test packet is prepared for the determination of the exposed situation, a band that is available to another signal is reduced. Therefore, only in a case where, as described above, the exposed situation is suspected to be present and the determination thereof wants to be performed, the method according to the present invention is performed and thus a network load can be diminished.

In the present embodiment, it is noted that the history information is always acquired or statistically processed in each wireless station, that the history information may be transmitted to the wireless environment evaluation section from the timing at which the exposed situation is suspected to be present, and that the history information may be acquired from the timing at which the exposed situation is suspected to be present and the statistical processing may be started. Furthermore, the determination of the timing at which the exposed situation is suspected to be present does not need to be limited to being performed by the wireless environment evaluation section. Although the determination is performed by the STA or the AP, this poses no problem.

Embodiment 7

An example is described in which control of the transmission station and the reception station is performed after the exposed situation in transmission by the transmission station and the exposed situation in reception by the reception station, which are estimated with the methods in Embodiments 1 to 6.

In the exposed situation in transmission, the transmission opportunity acquisition rate is lower than that of a neighboring wireless station. Therefore, the transmission opportunity holding duration of the transmission opportunity that is acquired one time is lengthened and thus this unfairness is solved. For example, a default value of TXOP Limit that is a maximum value of the transmission opportunity holding duration for every access category, is set in the IEEE 802.11 standard, and the wireless station performs the transmission according to the default value. A value of TXOP Limit that is higher than the default value is set for the wireless station that is in the exposed situation in transmission. The value that is set is set to be a value at which the degree $EXP_{TX}$ of the exposed situation in transmission is 1, that is, the transmission opportunity acquisition rate F' that is calculated from the transmission delay which is acquired in the wireless station is the same as the transmission opportunity acquisition rate F in the congesting situation in transmission, and thus the unfairness can be solved. It is noted that an equation for calculating F' is as follows.

$$F'=Hs/(D_M+H_M)$$

In the equation, the average transmission opportunity holding duration Hs in the system and the average time $D_M$ of the transmission delay that the wireless station itself undergoes are set not to be changed, only the average transmission opportunity holding duration $H_M$ of the wireless station itself is adjusted, and thus a calculation load may be reduced.

In the exposed situation in reception, the normal reception rate is lower than that of a neighboring wireless station. Therefore, regardless of the fact that the reception station cannot perform the reception, the frequency with which the transmission station transmits data is high, and a system capacity is reduced due to unnecessary consumption of a band. This leads not only to a decrease in throughput of the reception station, but also to a decrease in throughout of another wireless station. Methods of solving or avoiding this are given as follows.

e1: RTS in the transmission station is used e2: A method in which the transmission opportunity is acquired in the reception station and is delivered to the transmission station is used e3: Data from the transmission station, which is destined for the reception station, is transmitted over another network e4: In a case where the AP is in the exposed situation in reception, a channel that is used by the AP itself is changed e5: If a case where the STA is in the exposed situation in reception, the AP to which the STA itself belongs is changed In e1, if the exposed situation in reception is assumed, the longer a channel use time the signal has, the lower a probability that the reception will be normally performed in the reception station. Therefore, if an RTS signal has a short channel use time, there is a high probability that the reception will be normally performed in the reception station, and the reception station can reliably receive data due to an NAV that is set by a CTS signal which is transmitted in a case where the RTS signal can be normally received.

e2 is a technique that can solve a problem that the hidden wireless stations cannot normally perform the reception. Consequently, the transmission station that has a signal of data which is destined for the reception station that is determined as being in the exposed situation in reception performs control that acquires the transmission opportunity and delivers the acquired transmission opportunity to the reception station. Thus, the signal that is destined for the reception station can be reliably transmitted. It is noted that, in this case, the transmission station and the reception station are assumed to be linked over another network.

In e3, the signal is transmitted to the reception station in the exposed situation in reception over another network. Accordingly, in a network that is based on the CSMA/CA method, because a band is not consumed due to unnecessary retransmission, this leads to an improvement in throughput of another wireless station. It is noted that, because a band that is also available over another network is present, the number of wireless stations that can use the present method is assumed to be limited. Therefore, a band in another network, which is available to the system, is determined in advance, and, starting from a station that has a high degree of the exposed situation in reception, terminals/stations may be set to use another network within a range of bands that are available in the network.

In e4, in a case where the AP is in the exposed situation in reception, the channel that is used by the AP itself is changed, and thus the exposed situation in reception itself is possible avoided.

In e5, in a case where a change for belonging to the AP that uses the same channel takes place, the APs that use the same channel, which are possibly observed from the STA itself are compared, and the STA belongs to an AP that has the highest band use rate. This is because an AP that has a low band use rate has a low frequency with which a signal is sent out, has difficulty in causing the AP itself to be exposed, and has difficulty in being in the exposed situation in reception.

Furthermore, in Embodiment 3, in a case where a change for belonging to an AP that uses a different channel takes place, although the AP is not the AP to which the STA itself does not belong, if a relationship in which communication with the AP is possible is established, the exposed situation in reception is possibly determined. Because of this, the change for belonging to the AP is caused to take place, and thus the exposed situation in reception is possibly avoided.

It is noted that improvements in a combination of the measures described above, which result from supervisory or inferiority or from ingenuity, are present depending on the exposed situation in reception and the exposed situation in transmission, and thus is described as follows.

In a case where the AP and the STA are both in the exposed situation in reception, when the transmission and reception has a low probability of both succeeding over the network that is based on the CSMA/CA method and the degree of the exposed situation in reception is high, in the methods e1 and e2, the effectiveness decreases and a probability of consuming a band increases due to the unnecessary retransmission. Because of this, the method e3 or e4 is effective.

In a case where one wireless station is in the exposed state in transmission and the other wireless station is in the exposed state in reception, if both of the method e1 and the method in which the transmission opportunity holding duration is lengthened are configured, there is a likelihood that a long time NAV will be configured for a neighboring wireless station due to the RTS signal that fails. Thus, it is better not to use both of the methods together. In a case where the method e2 is used, when it comes to the transmission opportunity that is acquired and delivered, the holding duration of the transmission opportunity that is acquired is lengthened, and thus the unfairness is possibly solved.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless environment evaluation method evaluating a wireless environment of a wireless communication system, which is in an exposed situation in reception in which a normal reception rate of a prescribed wireless station decreases due to hidden wireless stations, in which a plurality of wireless stations share a same wireless channel and perform wireless communication using CSMA/CA (Carrier Sense Multiple Access/Collision Avoidance) method, the wireless environment evaluation method comprising:

acquiring a transmission and reception history of wireless signals transmitted and received between the plurality of wireless stations, and acquiring or estimating a number of wireless stations in transmission standby, based on the transmission and reception history;

calculating a normal reception rate S in a congesting situation in reception according to the number of wireless stations in transmission standby, where the normal reception rate indicates a probability that transmission timing for the wireless stations in transmission standby overlap;

acquiring a normal reception rate S' of the wireless signals per a fixed channel use time, from the transmission and reception history in the prescribed wireless station; and evaluating a degree of the exposed situation in reception according to a ratio of the normal reception rate S' to the normal reception rate S, such that the degree of the exposed situation in reception is larger as the ratio decreases.

2. A wireless environment evaluation method evaluating a wireless environment of a wireless communication system, which is in an exposed situation in reception in which a normal reception rate of a prescribed wireless station decreases due to hidden wireless stations, in which a plurality of wireless stations share a same wireless channel and perform wireless communication using CSMA/CA (Carrier Sense Multiple Access/Collision Avoidance) method, the wireless environment evaluation method comprising:

acquiring a normal reception rate S measured in another wireless station in which a congesting situation in reception according to a number of wireless stations in transmission standby is estimated to be the same as in the prescribed wireless station, based on a transmission and reception history of wireless signals transmitted and received between the plurality of wireless stations, where the normal reception rate indicates a probability that transmission timing for the wireless stations in transmission standby overlap;

acquiring a normal reception rate S' of the wireless signals per a fixed channel use time from the transmission and reception history in the prescribed wireless station; and evaluating a degree of the exposed situation in reception according to a ratio of the normal reception rate S' to the normal reception rate S, such that the degree of the exposed situation in reception is larger as the ratio decreases.

3. A wireless environment evaluation method evaluating a wireless environment of a wireless communication system, which is in an exposed situation in reception in which a normal reception rate of a prescribed wireless station decreases due to hidden wireless stations, in which a plurality of wireless stations share a same wireless channel and perform wireless communication using CSMA (Carrier Sense Multiple Access/Collision Avoidance) method, the wireless environment evaluation method comprising:

acquiring a transmission and reception history of a specific wireless signal periodically transmitted and received between the plurality of wireless stations, and acquiring a normal reception rate of the specific wireless signal from the transmission and reception history; and evaluating a degree of the exposed situation in reception according to the normal reception rate of the specific wireless signal, such that the degree of the exposed situation in reception is larger as the ratio decreases.

4. The wireless environment evaluation method according to claim 3, wherein the precision of evaluation of the exposed situation in reception in accordance with the normal reception rate of the specific wireless signal is set according to a priority, a transmission interval, and a channel use time of the specific wireless signal.

5. A wireless environment evaluation method evaluating a wireless environment of a wireless communication system, which is in an exposed situation in transmission in which a transmission opportunity acquisition rate of a prescribed wireless station decreases due to hidden wireless stations, in which a plurality of wireless stations share a same wireless channel and perform wireless communication using CSMA/CA (Carrier Sense Multiple Access/Collision Avoidance) method, the wireless environment evaluation method comprising:

acquiring a transmission and reception history of wireless signals transmitted and received between the plurality of wireless stations, and acquiring or estimating a number of wireless stations in transmission standby, based on the transmission and reception history;

calculating a transmission opportunity acquisition rate F in a congesting situation in transmission according to the number of wireless stations in transmission standby;

acquiring a transmission delay of the wireless signals from the transmission and reception history in the prescribed wireless station, and calculating a transmission opportunity acquisition rate F' from the transmission delay; and evaluating a degree of the exposed situation in transmission according to a ratio of the transmission opportunity acquisition rate F' to the transmission opportunity acquisition rate F, such that the degree of the exposed situation in transmission is larger as the ratio decreases.

6. A wireless environment evaluation method evaluating a wireless environment of a wireless communication system, which is in an exposed situation in transmission in which a transmission opportunity acquisition rate of a prescribed wireless station decreases due to hidden wireless stations, in which a plurality of wireless stations share a same wireless channel and perform wireless communication using CSMA/CA (Carrier Sense Multiple Access/Collision Avoidance) method, the wireless environment evaluation method comprising:

acquiring a transmission opportunity acquisition rate F measured in another wireless station in which a congesting situation in transmission according to a number of wireless stations in transmission standby is estimated to be the same as in the prescribed wireless station, based on a transmission and reception history of wireless signals transmitted and received between the plurality of wireless stations;

acquiring a transmission delay of the wireless signals from the transmission and reception history in the prescribed wireless station, and calculating a transmission opportunity acquisition rate F' from the transmission delay; and evaluating a degree of the exposed situation in transmission according to a ratio of the transmission opportunity acquisition rate F' to the transmission opportunity acquisition rate F, such that the degree of the exposed situation in transmission is larger as the ratio decreases.

7. A wireless environment evaluation method evaluating a wireless environment of a wireless communication system, which is in an exposed situation in transmission in which a transmission opportunity acquisition rate of a prescribed wireless station decreases due to hidden wireless stations in which a plurality of wireless stations share a same wireless channel and perform wireless communication using CSMA/CA (Carrier Sense Multiple Access/Collision Avoidance) method, the wireless environment evaluation method comprising:

acquiring a transmission and reception history of a specific wireless signal periodically transmitted and received between the plurality of wireless stations, and acquiring a transmission delay of the specific wireless signal from the transmission and reception history; and evaluating a degree of the exposed situation in transmission according to the transmission delay of the specific wireless signal, such that the degree of the exposed situation in transmission is larger as the ratio decreases.

8. The wireless environment evaluation method according to claim 7, wherein:

the precision of evaluation of the exposed situation in transmission in accordance with the transmission delay of the specific wireless signal is set according to a priority, a transmission interval, and a channel use time of the specific wireless signal.

9. A wireless communication system in which a plurality of wireless stations share a same wireless channel and perform wireless communication using CSMA/CA (Carrier Sense Multiple Access/Collision Avoidance) method, the wireless communication system evaluates one of exposed situation in reception in which a normal reception rate of a prescribed wireless station decreases due to hidden wireless stations and an exposed situation in transmission in which a transmission opportunity acquisition rate of a prescribed wireless station decreases due to hidden wireless stations, the wireless communication system comprising:

a unit acquiring a transmission and reception history of wireless signals transmitted and received between the plurality of wireless stations;

a unit acquiring or estimating a number of wireless stations in transmission standby based on the transmission and reception history of the wireless signals, and calculating a normal reception rate S in a congesting situation in reception and a transmission opportunity acquisition rate F in a congesting situation in transmission, according to the number of wireless stations in transmission standby;

a unit measuring a normal reception rate S' of the wireless signals per a fixed channel use time from the transmission and reception history in the prescribed wireless station;

a unit acquiring a transmission delay of the wireless signals from the transmission and reception history in the prescribed wireless station and calculating a transmission opportunity acquisition rate F' from the transmission delay; and a unit evaluating a degree of the exposed situation in reception according to a ratio of the normal reception rate S' to the normal reception rate S, and evaluating a degree of the exposed situation in transmission according to a ratio of the transmission opportunity acquisition rate F' to the transmission opportunity acquisition rate F, such that the degree of the exposed situation in reception is larger as the ratio decreases and the degree of the exposed situation in transmission is larger as the ratio decreases.

10. A wireless communication system in which a plurality of wireless stations perform wireless communication using CSMA/CA (Carrier Sense Multiple Access/Collision Avoidance) method, the wireless communication system evaluates one of an exposed situation in reception in which a normal reception rate of a prescribed wireless station decreases due to hidden wireless stations and an exposed situation in transmission in which a transmission opportunity acquisition rate of the prescribed wireless station decreases due to hidden wireless stations, the wireless communication system comprising:

a unit acquiring a transmission and reception history of wireless signals transmitted and received between the plurality of wireless stations;

a unit, based on the transmission and reception history of the wireless signals, acquiring a normal reception rate S in another wireless station in which a congesting situation in reception according to a number of wireless stations in transmission standby is estimated to be the same as in the prescribed wireless station, and acquiring a transmission opportunity acquisition rate F in another wireless station in which the congesting situation in transmission according to the number of wireless stations in transmission standby is estimated to be the same as in the prescribed wireless station;

a unit measuring a normal reception rate S' of the wireless signals per a fixed channel use time from the transmission and reception history in the prescribed wireless station;

a unit acquiring a transmission delay of the wireless signals from the transmission and reception history in the prescribed wireless station, and calculating a transmission opportunity acquisition rate F' from the transmission delay; and a unit evaluating a degree of the exposed situation in reception according to a ratio of the normal reception rate S' to the normal reception rate S, and evaluating a degree of the exposed situation in transmission according to a ratio of the transmission opportunity acquisition rate F' to the transmission opportunity acquisition rate F, such that the degree of the exposed situation in reception is larger as the ratio decreases and the degree of the exposed situation in transmission is larger as the ratio decreases.

* * * * *